United States Patent
Lu et al.

(10) Patent No.: US 9,954,719 B2
(45) Date of Patent: Apr. 24, 2018

(54) DATA TRANSMISSION METHOD AND DEVICE

(71) Applicant: Huawei Technologies Co., Ltd., Shenzhen (CN)

(72) Inventors: Lei Lu, Shanghai (CN); Dai Shi, Shanghai (CN); Wenting Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/638,173

(22) Filed: Jun. 29, 2017

(65) Prior Publication Data
US 2017/0302500 A1    Oct. 19, 2017

Related U.S. Application Data

(63) Continuation of application No. PCT/CN2014/096011, filed on Dec. 31, 2014.

(51) Int. Cl.
*H04B 1/00* (2006.01)
*H04L 29/08* (2006.01)
(Continued)

(52) U.S. Cl.
CPC ............. *H04L 29/08* (2013.01); *H04B 7/024* (2013.01); *H04L 25/03898* (2013.01); *H04L 29/02* (2013.01); *H04B 7/0669* (2013.01)

(58) Field of Classification Search
USPC ................................................ 375/295, 144
See application file for complete search history.

(56) References Cited

U.S. PATENT DOCUMENTS

2003/0231700 A1*  12/2003  Alamouti ............. H04B 7/0617
                                                                                    375/144
2013/0039265 A1    2/2013  Shin et al.
(Continued)

FOREIGN PATENT DOCUMENTS

| CN | 102056325 A | 5/2011 |
| CN | 102857437   | 1/2013 |

(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 12)" 3GPP TS 36.212 V12.2.0 Technical Specification, Sep. 2014, 89 pgs.
(Continued)

*Primary Examiner* — Wednel Cadeau
(74) *Attorney, Agent, or Firm* — Slater Matsil, LLP

(57) ABSTRACT

Embodiments relate to a data transmission method. A relay node receives information that is about an SCMA codebook used by the relay node and that is sent by a destination node. The relay node receives two or more source signals sent by two or more source nodes. The relay node performs network coding on the received two or more source signals. The relay node performs SCMA codebook mapping on a signal obtained after the network coding, so as to obtain at least two modulation symbols. The relay node sends to the destination node, the at least two modulation symbols obtained after the SCMA mapping.

17 Claims, 9 Drawing Sheets

(51) Int. Cl.
*H04L 29/02* (2006.01)
*H04L 25/03* (2006.01)
*H04B 7/024* (2017.01)
*H04B 7/06* (2006.01)

(56) References Cited

U.S. PATENT DOCUMENTS

2013/0182791 A1* 7/2013 Dhakal ................ H04L 1/0618
375/295
2014/0341022 A1 11/2014 Wei et al.

FOREIGN PATENT DOCUMENTS

CN 103248373 A 8/2013
WO WO 2016044848 A1 * 3/2016 ............. H04B 7/024
WO WO 2016115531 A1 * 7/2016

OTHER PUBLICATIONS

"3rd Generation Partnership Project; Technical Specification Group Radio Access Network; Evolved Universal Terrestrial Radio Access (E-UTRA); Physical layer for relaying operation (Release 12)", 3 GPP TS 36.216 V12.0.0 Technical Specification, Sep. 2014, 16 Pgs.
Nikopour et al., "Sparse Code Multiple Access," XP55227113A: IEEE 24th International Symposium on Personal, Indoor and Mobile Radio Communications: Fundamentals and PHY Track; Ottawa Wireless R&D Centre; Huawei Technologies Canada Co., LTD.; 2013; 6 pages; Ottawa, Ontario, Canada.

* cited by examiner

DATA TRANSMISSION METHOD AND DEVICE

CROSS-REFERENCE TO RELATED APPLICATIONS

This application is a continuation of International Patent Application No. PCT/CN2014/096011, filed on Dec. 31, 2014, the disclosure of which is hereby incorporated by reference in its entirety.

TECHNICAL FIELD

The present invention relates to the communications field, and more specifically, to a data transmission method and device.

BACKGROUND

The idea of cooperative communication originates from relay communication. That is, a user transmits information by cooperating with another relay node to ensure communication between the user and a destination node. Currently, a relay-based next-generation network architecture has become a research hotspot. With a cooperative transmission technology, the network architecture not only can support direct communication between a source node and a destination node, but also allows, by introducing one or more relay nodes, information sent by the source node to be processed in a particular manner by each relay node before the information is forwarded to the destination node. In this multi-hop transmission manner, obstacles such as a building that obstructs electric wave transmission are bypassed, so that impact caused by large-scale fading is overcome to some extent, a path loss between a transmit terminal and a receive terminal is reduced, and transmit power of a device is reduced, thereby suppressing system interference and increasing a signal-to-noise ratio of a signal. In addition, because the destination node may receive and process, according to different combination manners, signals that are from different transmission nodes. In addition, cooperative transmission can significantly reduce impact caused by small-scale fading on a channel, so that a signal transmission environment is improved to some extent, and different diversity gains are obtained.

Network coding is an information exchange technology that integrates routing and coding. The idea of network coding is to perform, on each node on a network, linear or non-linear processing on information received on each channel, and then forward processed information to a downstream node. If network coding is used, an intermediate node on a network does not perform storage and forwarding only, but instead, encodes received information and sends encoded information, so that a capacity and robustness of the network are improved. System performance can further be improved by organically combining network coding and cooperative communication.

However, in an existing technical solution in which network coding and cooperative communication are combined, there is still a problem of low transmission efficiency. Therefore, transmission efficiency or transmission flexibility further needs to be improved.

SUMMARY

Embodiments of the present invention provide a data transmission method and device, so as to improve transmission efficiency or transmission flexibility.

According to a first aspect, a data transmission method is provided. The method includes receiving, by a relay node, information that is about an SCMA codebook used by the relay node and that is sent by a destination node. The SCMA codebook includes two or more code words. The code word is a multi-dimensional complex vector and is used to represent a mapping relationship between data and at least two modulation symbols. The at least two modulation symbols include at least one zero modulation symbol and at least one non-zero modulation symbol. The method also includes receiving, by the relay node, two or more source signals sent by two or more source nodes. The method also includes performing, by the relay node, network coding on the received two or more source signals. The method also includes performing, by the relay node by using the codebook indicated by the information about the SCMA codebook, SCMA codebook mapping on a signal obtained after the network coding, so as to obtain a relay signal. The method further includes sending, by the relay node to the destination node, the relay signal obtained after the SCMA codebook mapping.

According to a second aspect, a data transmission method is provided. The method includes separately sending, by a destination node to two or more source nodes, information about an SCMA codebook used by each source node. The SCMA codebook includes two or more code words. The code word is a multi-dimensional complex vector and is used to represent a mapping relationship between data and at least two modulation symbols. The at least two modulation symbols include at least one zero modulation symbol and at least one non-zero modulation symbol. The method also includes sending, by the destination node, information about an SCMA codebook used by a relay node to the relay node. The method also includes receiving, by the destination node, a relay signal sent by the relay node. The relay signal sent by the relay node is at least two modulation symbols obtained by the relay node after the relay node receives two or more first source signals sent by the two or more source nodes, performs network coding on the received two or more first source signals, and performs, by using the codebook indicated by the information about the SCMA codebook used by the relay node, SCMA codebook mapping on a signal obtained after the network coding. The at least two modulation symbols may include at least one zero modulation symbol and at least one non-zero modulation symbol. The method further includes receiving, by the destination node, a second source signal sent by at least one of the source nodes. The second source signal is obtained by the source node by performing SCMA codebook mapping by using the codebook indicated by the information about the SCMA codebook used by the source node. The second source signal and the relay signal are sent by using a same time-frequency resource.

According to a third aspect, a data transmission method is provided. The method includes receiving, by a source node, information about a first resource sent by a destination node. The method also includes sending, by the source node, a first source signal to the destination node or a relay node or both on the first resource. The method also includes receiving, by the source node, information about a second resource and information about an SCMA codebook used by the source node that are sent by the destination node. The SCMA codebook includes two or more code words. The code word is a multi-dimensional complex vector and is used to represent a mapping relationship between data and at least two modulation symbols. The at least two modulation symbols include at least one zero modulation symbol and at least one non-zero modulation symbol. The method further includes sending, by the source node, a second source signal to the destination node or the relay node or both on the second resource. The second source signal is at least two modulation symbols obtained by the source node by performing codebook mapping on data by using the SCMA codebook indicated by the information about the SCMA codebook.

According to a fourth aspect, a data transmission device is provided. The device 700 includes a bus 710, a processor 720 connected to the bus, a memory 730 connected to the bus, a transmitter 750 connected to the bus, and a receiver 740 connected to the bus. The processor calls, by using the bus, a program stored in the memory, so as to control the receiver to receive information that is about an SCMA codebook used by the device and that is sent by a destination node. The SCMA codebook includes two or more code words. The code word is a multi-dimensional complex vector and is used to represent a mapping relationship between data and at least two modulation symbols. The at least two modulation symbols include at least one zero modulation symbol and at least one non-zero modulation symbol. The processor calls, by using the bus, the program stored in the memory, so as to further control the receiver to receive two or more source signals sent by two or more source nodes. The processor is further configured to perform, by using the codebook indicated by the information about the SCMA codebook, SCMA codebook mapping on a signal obtained after network coding, so as to obtain a relay signal. The relay signal is at least two modulation symbols. The at least two modulation symbols may include at least one zero modulation symbol and at least one non-zero modulation symbol. The processor calls, by using the bus, the program stored in the memory, so as to control the transmitter to send, to the destination node, the relay signal obtained after the SCMA codebook mapping.

According to a fifth aspect, a data transmission device is provided. The device 800 includes a bus 810, a processor 820 connected to the bus, a memory 830 connected to the bus, a transmitter 850 connected to the bus, and a receiver 840 connected to the bus. The processor calls, by using the bus, a program stored in the memory, so as to control the transmitter to separately send, to two or more source nodes, information about an SCMA codebook used by each source node. The SCMA codebook includes two or more code words. The code word is a multi-dimensional complex vector and is used to represent a mapping relationship between data and at least two modulation symbols. The at least two modulation symbols include at least one zero modulation symbol and at least one non-zero modulation symbol. The processor calls, by using the bus, the program stored in the memory, so as to further control the transmitter to send information about an SCMA codebook used by a relay node to the relay node. The processor further calls, by using the bus, the program stored in the memory, so as to control the receiver to receive a relay signal sent by the relay node. The relay signal sent by the relay node is at least two modulation symbols obtained by the relay node after the relay node receives two or more first source signals sent by the two or more source nodes, performs network coding on the received two or more first source signals, and performs, by using the codebook indicated by the information about the SCMA codebook used by the relay node, SCMA codebook mapping on a signal obtained after the network coding. The least two modulation symbols may include at least one zero modulation symbol and at least one non-zero modulation symbol. The processor calls, by using the bus, the program stored in the memory so as to control the receiver to receive a second source signal sent by at least one of source nodes. The second source signal is obtained by the source node by performing SCMA codebook mapping by using the codebook indicated by the information about the SCMA codebook used by the source node. The second source signal and the relay signal are sent by using a same time-frequency resource.

According to a sixth aspect, a data transmission device is provided. The device 900 includes a bus 910, a processor 920 connected to the bus, a memory 930 connected to the bus, a transmitter 950 connected to the bus, and a receiver 940 connected to the bus. The processor calls, by using the bus, a program stored in the memory, so as to control the receiver to receive information about a first resource sent by a destination node, and control the receiver to receive information about a second resource and information about an SCMA codebook used by the device that are sent by the destination node. The SCMA codebook includes two or more code words. The code word is a multi-dimensional complex vector and is used to represent a mapping relationship between data and at least two modulation symbols. The at least two modulation symbols include at least one zero modulation symbol and at least one non-zero modulation symbol. The processor calls, by using the bus, the program stored in the memory, so as to control the transmitter to send a first source signal to the destination node or a relay node or both on the first resource, and control the transmitter to send the second source signal to the destination node or the relay node or both on the second resource. The second source signal is at least two modulation symbols obtained by the source node by performing codebook mapping on data by using the SCMA codebook indicated by the information about the SCMA codebook.

According to the data transmission method and device in the embodiments of the present invention, a relay node may send a signal obtained after network coding and SCMA codebook mapping. This makes it possible for the relay node and a source node to send signals on a same time-frequency resource, thereby improving transmission efficiency of a system.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an executable thread, a program, and/or a computer. Both a computing device and an application that runs on the computing device may be components. One or more components may reside within a process and/or an executable thread, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

In addition, aspects or features of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (compact disk), a DVD (Digital Versatile Disk), a smart card and a flash memory component (for example, an EPROM (Erasable Programmable Read-Only Memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

Figure 1:
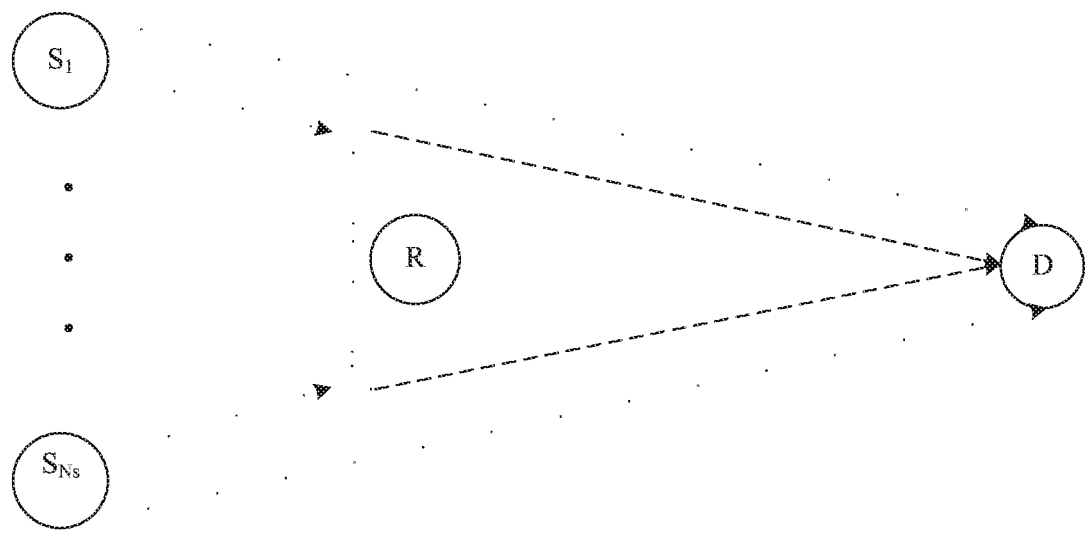
FIG. 1 is a schematic diagram of a communications system to which a data transmission method of the present invention is applicable.

First, an environment to which the embodiments of the present invention are applied is described. FIG. 1 is a structural diagram of a wireless relay network applied to the embodiments of the present invention. It may be learned from FIG. 1 that the wireless relay network includes source nodes $S_1$ to $S_{Ns}$, a relay node R, and a destination node D. The relay node R and the destination node D may have a multi-antenna structure. Solid lines in FIG. 1 represent that source nodes send source signals to the relay node and the destination node, for example, by means of directional transmission or broadcast. Dashed lines represent that the relay node sends relay signals to the destination node, for example, by means of directional transmission or broadcast. Certainly, in an actual situation, the wireless relay network may include multiple relay nodes. Because operations performed by the relay nodes are similar, only one relay node is shown in FIG. 1.

The source node may be a network device. The network device may be a device configured to communicate with a mobile device. A network side device may be a BTS (Base Transceiver Station) in GSM (Global System for Mobile Communications) or CDMA (Code Division Multiple Access), or may be an NB (NodeB) in WCDMA (Wideband Code Division Multiple Access), or may be an eNB or eNodeB (Evolved Node B) in LTE (Long Term Evolution) or an access point, or a vehicle-mounted device, a wearable device, a network side device in a future 5G network, or a network device in a PLMN (Public Land Mobile Network) network in future evolution.

The source nodes $S_1$ to $S_{Ns}$ may each be a terminal device, which may also be referred to as user equipment (UE), an access terminal, a subscriber unit, a subscriber station, a mobile station, a mobile terminal, a remote station, a remote terminal, a mobile device, a user terminal, a terminal, a wireless communications device, a user agent, or a user device. The access terminal may be a cellular phone, a cordless phone, a SIP (Session Initiation Protocol) phone, a WLL (Wireless Local Loop) station, a PDA (Personal Digital Assistant), a handheld device or a computing device that has a wireless communication function, or another processing device or a vehicle-mounted device or a wearable device connected to a wireless modem, a terminal device in a future 5G network, or a terminal device in a PLMN (Public Land Mobile Network) network in future evolution.

The following describes Sparse Code Multiple Access (SCMA). SCMA is a non-orthogonal multiple access technology. Certainly, persons skilled in the art may use another technical name as the name of this technology instead of SCMA, and this should not be construed as a limitation on the protection scope of the present invention. In this technology, multiple different data streams are transmitted on a same transmission resource by using SCMA codebooks, where different SCMA codebooks are used for different data streams, so as to improve resource utilization. The data streams may be from a same terminal device or may be from different terminal devices.

An SCMA codebook is a set of two or more code words.

A code word may be a multi-dimensional complex vector with two or more dimensions, and is used to represent a mapping relationship between data and two or more modulation symbols. The two or more modulation symbols include at least one zero modulation symbol and at least one non-zero modulation symbol, and the data may be binary bit data or m-ary data. Optionally, a relationship between the zero modulation symbol and the non-zero modulation symbol may be that a quantity of zero modulation symbols is not less than a quantity of non-zero modulation symbols.

The SCMA codebook includes two or more code words. The SCMA codebook may represent a mapping relationship between possible data combinations of data of a particular length and code words in the SCMA codebook.

In the SCMA technology, data in a data stream is directly mapped to a code word, that is, a multi-dimensional complex vector, in an SCMA codebook according to a mapping relationship, so as to implement spreading and sending of the data on multiple resource units. The data herein may be binary bit data or may be m-ary data, and the multiple resource units may be resource units in a time domain, a frequency domain, a space domain, a time-frequency domain, a time-space domain, or a time-frequency-space domain.

Figure 2:
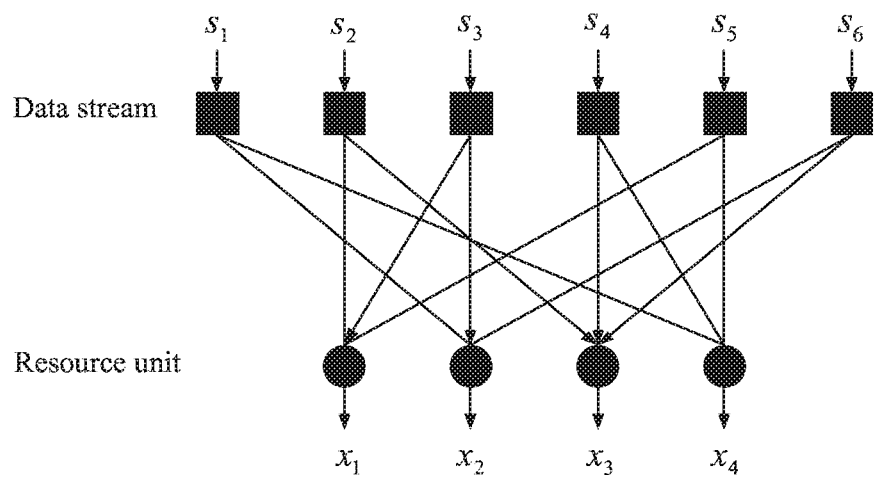
FIG. 2 is a schematic diagram of SCMA codebook mapping processing.

FIG. 2 is a schematic diagram of SCMA codebook mapping processing (or coding processing) in an example in which six data streams reuse four resource units. As shown in FIG. 2, the six data streams form a group, and the four resource units form a code unit. One resource unit may be one subcarrier, may be one resource element (RE), or may be one antenna port. In FIG. 2, if there is a connection line between a data stream and a resource unit, it indicates that for at least one data combination of the data stream, a non-zero modulation symbol is sent on the resource unit after codebook mapping is performed. Or, if there is no connection line between a data stream and a resource unit, it indicates that for all possible data combinations of the data stream, modulation symbols sent on the resource unit after codebook mapping is performed are zero modulation symbols. Data combinations of a data stream may be understood according to the following description. For example, in a binary bit data stream, 00, 01, 10, and 11 are all possible binary bit data combinations. For ease of description, data in the data streams is respectively represented by s1 to s6, and symbols sent on the resource units are respectively represented by x1 to x4. In addition, a connection line between a data stream and a resource unit represents that a modulation symbol is sent on the resource unit after data in the data stream is spread. The modulation symbol may be a zero symbol, or may be a non-zero symbol. If there is no connection line between a data stream and a resource unit, it indicates that no modulation symbol is sent on the resource unit after data in the data stream is spread.

It may be learned from FIG. 2 that data in each data stream is sent on multiple resource units after being spread. In addition, a symbol sent on each resource unit is an overlay of non-zero modulation symbols obtained after data from multiple data streams is spread. For example, after data s3 of data stream 3 is spread, non-zero modulation symbols are sent on resource unit 1 and resource unit 2, and data x2 sent on resource unit 3 is an overlay of non-zero modulation symbols obtained after data s2, s4, and s6 in data stream 2, data stream 4, and data stream 6 are separately spread. Because a quantity of data streams may be greater than a quantity of resource units, the SCMA system can effectively improve a network capacity, including a quantity of users that can access the system and spectral efficiency.

A code word in an SCMA codebook is usually in the following form:

$$\begin{pmatrix} c_{1,q} \\ c_{2,q} \\ \vdots \\ c_{N,q} \end{pmatrix},$$

and the corresponding SCMA codebook is usually in the following form:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \dots, \begin{pmatrix} c_{1,Q_m} \\ c_{2,Q_m} \\ \vdots \\ c_{N,Q_m} \end{pmatrix} \right\},$$

where N is a positive integer greater than 1, and may represent a quantity of resource units included in one code unit, or may be understood as a length of a code word. $Q_m$ is a positive integer greater than 1, represents a quantity of code words included in the SCMA codebook, and may correspond to a modulation order, where for example, during sampling of quadrature phase shift keying (QPSK) or 4th-order modulation, $Q_m$ is 4; q is a positive integer, and $1 \le q \le Q_m$; and an element $c_{n,q}$ included in the SCMA codebook and the code word is a complex number, and $c_{n,q}$ may be mathematically represented by:

$$c_{n,q} \in \{0, \alpha^* \exp(j^*\beta)\}, 1 \le n \le N, 1 \le q \le Q_m$$

where $\alpha$ may be any real number, $\beta$ may be any value, and N and $Q_m$ may be positive integers.

In addition, a mapping relationship may be formed between code words in the SCMA codebook and data. For example, a mapping relationship may be formed between the code words in the SCMA codebook and 2-bit data.

For example, "00" may correspond to a code word 1, that is, $$\begin{pmatrix} c_{1,1} \\ c_{2,1} \\ \vdots \\ c_{N,1} \end{pmatrix};$$

"01" may correspond to a code word 2, that is, $$\begin{pmatrix} c_{1,2} \\ c_{2,2} \\ \vdots \\ c_{N,2} \end{pmatrix};$$

"10" may correspond to a code word 3, that is, $$\begin{pmatrix} c_{1,3} \\ c_{2,3} \\ \vdots \\ c_{N,3} \end{pmatrix};$$

"11" may correspond to a code word 4, that is, $$\begin{pmatrix} c_{1,4} \\ c_{2,4} \\ \vdots \\ c_{N,4} \end{pmatrix}.$$

Based on the foregoing FIG. 2, when there is a connection line between a data stream and a resource unit, an SCMA codebook corresponding to the data stream and code words in the SCMA codebook should have the following characteristics: for at least one code word in the SCMA codebook, a non-zero modulation symbol is sent on a corresponding resource unit. For example, when there is a connection line between data stream 3 and resource unit 1, at least one code word in an SCMA codebook corresponding to data stream 3 meets $c_{1,q} \neq 0$, where $1 \leq q \leq Q_m$.

When there is no connection line between a data stream and a resource unit, an SCMA codebook corresponding to the data stream and code words in the SCMA codebook should have the following characteristics: For all code words in the SCMA codebook, zero modulation symbols are sent on corresponding resource units. For example, there is no connection line between data stream 3 and resource unit 3, and any code word in the SCMA codebook corresponding to data stream 3 meets $c3_{3,q}=0$, where $1 \leq q \leq Q_m$.

Based on the above description, when a modulation order is QPSK, the SCMA codebook corresponding to data stream 3 in the foregoing FIG. 2 may be in the following form and have the following characteristics:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $c_{n,q} = \alpha * \exp(j*\beta)$, $1 \leq n \leq 2$, $1 \leq q \leq 4$, and $\alpha$ and $\beta$ may be any real numbers. For any q, $1 \leq q \leq 4$. $c_{1,q}$ and $c_{2,q}$ are not zero at the same time, and there is at least one group of $q^1$ and $q_2$ in which $1 \leq q_1$ and $q_2 \leq 4$, so that $c_{1,q_1} \neq 0$ and $c_{2,q_2} \neq 0$.

For example, if data s3 of data stream 3 is "10", according to the foregoing mapping rule, the data combination is mapped to a code word, that is, a four-dimensional complex vector:

$$\begin{pmatrix} c_{1,3} \\ c_{2,3} \\ 0 \\ 0 \end{pmatrix}.$$

In a non-orthogonal multiple access system, a bipartite graph shown in FIG. 2 may also be represented by using a characteristic matrix. The characteristic matrix may be in the following form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m}$ represents an element in the characteristic matrix, m and n are natural numbers, and $1 \leq n \leq N$, $1 \leq m \leq M$. N rows respectively represent N resource units in one code unit, and M columns each represent a quantity of data streams that are in one group and that reuse resource units. Although the characteristic matrix may be expressed in a general form, the characteristic matrix may have the following characteristics.

In the characteristic matrix, the element $r_{n,m} \in \{0,1\}$, $1 \leq n \leq N, 1 \leq m \leq M$. When $r_{n,m}=1$, it may be explained according to a corresponding bipartite graph as that there is a connection line between an $m^{th}$ data stream and an $n^{th}$ resource unit. Certainly, $r_{n,m}=1$ may also be understood as that for at least one data combination of the $m^{th}$ data stream, a non-zero modulation symbol is sent on the $n^{th}$ resource unit after code word mapping is performed. When $r_{n,m}=0$, it may be explained according to a corresponding binary diagram as that there is no connection line between the $m^{th}$ data stream and the $n^{th}$ resource unit. Certainly, $r_{n,m}=0$ may also be understood as that for all possible data combinations of the $m^{th}$ data stream, zero modulation symbols are sent on the $n^{th}$ resource unit after code word mapping is performed.

Further, optionally, a quantity of elements o in the characteristic matrix is not less than a quantity of elements 1, so as to exhibit a characteristic of sparse coding.

In addition, a column in the characteristic matrix may be referred to as a characteristic sequence. The characteristic sequence may be expressed in the following form:

$$\begin{pmatrix} r_{1,m} \\ r_{2,m} \\ \vdots \\ r_{N,m} \end{pmatrix}, 1 \leq m \leq M.$$

Therefore, the characteristic matrix may also be considered to be a matrix including a series of characteristic sequences.

Based on the foregoing description of the characteristics of the characteristic matrix, for the example shown in FIG. 2, a corresponding characteristic matrix may be represented by:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

A characteristic sequence corresponding to the codebook $$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}$$

used by data stream 3 in FIG. 2 may be represented by:

$$\begin{pmatrix} 1 \\ 1 \\ 0 \\ 0 \end{pmatrix}.$$

Therefore, it may be considered that a correspondence between a codebook and a characteristic sequence is a one-to-one relationship, that is, one codebook uniquely corresponds to one characteristic sequence. A correspondence between a characteristic sequence and a codebook may be a one-to-multiple relationship, that is, one characteristic sequence may correspond to one or more codebooks. Therefore, a characteristic sequence may be understood as that the characteristic sequence corresponds to one or more codebooks, and each characteristic sequence includes an element 0 and an element 1. The element 0 represents that modulation symbols, at a position corresponding to the element 0, of all code words in a corresponding codebook are all zero modulation symbols. The element 1 represents that not all modulation symbols, at a position corresponding to the element 1, of all code words in a corresponding codebook are zero modulation symbols or all the modulation symbols are non-zero modulation symbols.

A correspondence between a characteristic sequence and a codebook may be determined by the following conditions:

(1) A total quantity of modulation symbols of a code word in a codebook is the same as a total quantity of elements in a corresponding characteristic sequence.

(2) For any element 1 in the characteristic sequence, at least one code word can be found in the corresponding codebook, so that a modulation symbol of the code word at a position corresponding to the element 1 is not a zero modulation symbol; for any element 0 in the characteristic sequence, modulation symbols, at a position corresponding to the element 0, of all code words in the corresponding codebook are all zero modulation symbols.

Therefore, in this embodiment of the present invention, a codebook includes two or more code words. The code word is a multi-dimensional complex vector and is used to represent a mapping relationship between data and at least two modulation symbols. The at least two modulation symbols include at least one zero modulation symbol and at least one non-zero modulation symbol. Each characteristic matrix includes two or more characteristic sequences, each characteristic matrix corresponds to one or more codebooks, and each characteristic sequence also corresponds to one or more codebooks. The characteristic sequence includes an element 0 and an element 1. The element 0 represents that modulation symbols, at a position corresponding to the element 0, of all code words in a corresponding codebook are all zero modulation symbols. The element 1 represents that not all modulation symbols, at a position corresponding to the element 1, of all code words in a corresponding codebook are zero modulation symbols or all the modulation symbols are non-zero modulation symbols.

In this embodiment of the present invention, multiple codebooks may be grouped into one or more codebook clusters. Each codebook cluster may include one or more codebooks. Any two codebooks, for example, codebook a and codebook b, in a same codebook cluster have the following characteristic: a total quantity of modulation symbols of a code word in the codebook a is the same as that of a code word in the codebook b. Therefore, codebooks in a codebook cluster meet that total quantities of modulation symbols of all code words are the same, that is, lengths of all the code words are the same, that is, quantities of resource units reused in data streams are the same.

In this embodiment of the present invention, alternatively, the multiple codebooks may be grouped into one or more codebook sets. Each codebook set may include one or more codebooks. Any two codebooks, for example, codebook c and codebook d, in a same codebook set have the following characteristics: (1) A total quantity of modulation symbols of a code word in codebook c is the same as that of a code word in codebook d. (2) For a position at which modulation symbols of all code words in codebook c are zero modulation symbols, modulation symbols of all code words in codebook d at the position are also all zero modulation symbols.

FIG. 2 is still used as an example for description, and it is assumed that a modulation order is QPSK. A codebook used by data stream 1 in FIG. 2 may be represented by codebook 1, and a codebook used by data stream 3 may be represented by codebook 3. Codebook 1 and codebook 3 may be respectively represented by:

$$\text{codebook 1} \left\{ \begin{pmatrix} 0 \\ e_{2,1} \\ 0 \\ e_{4,1} \end{pmatrix}, \begin{pmatrix} 0 \\ e_{2,2} \\ 0 \\ e_{4,2} \end{pmatrix}, \begin{pmatrix} 0 \\ e_{2,3} \\ 0 \\ e_{4,3} \end{pmatrix}, \begin{pmatrix} 0 \\ e_{2,4} \\ 0 \\ e_{4,4} \end{pmatrix} \right\}, \text{ and}$$

$$\text{codebook 3} \left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $e_{n,q}=\alpha*\exp(j*\beta)$, $n\in\{2,4\}$, $1\leq q\leq 4$, and $\alpha$ and $\beta$ may be any real numbers. For any q, $1\leq q\leq 4$. $e_{2,q}$ and $e_{4,q}$ are not zero at the same time, and there is at least one group of q1 and q2 so that $e_{2,q_1}\neq 0$ and $e_{4,q_2}\neq 0$, where and $1\leq q2\leq 4$.

Modulation symbols, at position 3 (which is corresponding to the third resource unit, that is, n=3), of all code words in codebook 1 are all zero modulation symbols, and modulation symbols, at position 3, of all code words in codebook 3 are also all zero modulation symbols. However, modulation symbols, at position 1 (which is corresponding to the first resource unit, that is, n=1), of all the code words in codebook 1 are all zero modulation symbols, and not all modulation symbols, at position 1, of all the code words in codebook 3 are zero modulation symbols. Therefore, codebook 1 and codebook 3 do not belong to a same codebook set.

For another example, for codebook 2 that has the following characteristic, codebook 2 may be represented by:

$$\text{codebook 2} \left\{ \begin{pmatrix} d_{1,1} \\ d_{2,1} \\ 0 \\ 0 \end{pmatrix}, \begin{pmatrix} d_{1,2} \\ d_{2,2} \\ 0 \\ 0 \end{pmatrix}, \begin{pmatrix} d_{1,3} \\ d_{2,3} \\ 0 \\ 0 \end{pmatrix}, \begin{pmatrix} d_{1,4} \\ d_{2,4} \\ 0 \\ 0 \end{pmatrix} \right\},$$

where $d_{n,q}=\alpha*\exp(j*\beta)$, $1\leq n\leq 2$, $1\leq q\leq 4$, and $\alpha$ and $\beta$ may be any real numbers. For any q, $1\leq q\leq 4$. $d_{1,q}$ and $d_{2,q}$ are not zero at the same time, and there is at least one group of q1 and q2 so that $d_{1,q_1}\neq 0$ and $d_{2,q_2}\neq 0$, where $1\leq q1\leq 4$ and $1\leq q2\leq 4$ Modulation symbols, at positions 1 and 2 (which are corresponding to the first and second resource units, that is, n=1, 2), of all code words in the codebook 2 are all zero modulation symbols, and modulation symbols, at positions 1 and 2, of all code words in codebook 3 are also all zero modulation symbols. In addition, only modulation symbols, at positions 1 and 2, of all the code words in the codebook 2 are zero modulation symbols, and only modulation symbols, at positions 1 and 2, of all the code words in the codebook 3 are zero modulation symbols. That is, for codebook 2 and codebook 3, the positions at which modulation symbols of all the code words are all zero modulation symbols are the same, that is, both are positions 1 and 2. Therefore, codebook 2 and codebook 3 belong to a same codebook set.

Based on the above description, in this embodiment of the present invention, each codebook cluster includes one or more codebook sets, each codebook set includes one or more codebooks, and each codebook includes two or more code words. Each codebook cluster meets that total quantities of modulation symbols of code words in the codebook cluster are the same. Each codebook set meets a condition that total quantities of modulation symbols of code words in the codebook set are the same. For all code words in any codebook in a same codebook set, positions at which modulation symbols of the code words are all zero modulation symbols are the same.

It should be further understood that in a non-orthogonal multiple access system, a codebook may be directly represented and stored. For example, the foregoing codebooks or code words in the codebooks are directly stored, or only modulation symbols, at a position corresponding to a characteristic sequence element that is an element 1, of code words are stored. Therefore, when the present invention is applied, it needs to be assumed that a network device and a terminal device in the non-orthogonal multiple access system may store a part of or all of the following content designed in advance:

(1) One or more characteristic matrices:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m} \in \{0,1\}$, $1 \le n \le N$, $1 \le m \le M$, and both M and N are positive integers greater than 1. M may represent a quantity of data streams that reuse resource units; N may represent a quantity of resource units included in one code unit, or may be understood as a length of a code word.

(2) One or more characteristic sequences:

$$\begin{pmatrix} r_{1,m} \\ r_{2,m} \\ \vdots \\ r_{N,m} \end{pmatrix},$$

where $1 \le m \le M$.

(3) One or more codebooks:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\},$$

where $Q_m \ge 2$. $Q_m$ may represent a modulation order corresponding to a codebook, and each codebook may correspond to a modulation order. N is a positive integer greater than 1, and may represent a quantity of resource units included in one code unit, or may be understood as a length of a code word.

The following describes SCMA decoding.

SCMA decoding may be implemented by using many methods, for example, by using an algorithm such as an MPA (Message Passing Algorithm) or a target genetic algorithm. Only the MPA is described herein.

The MPA decoding manner may be considered as a process for transferring a message. The "message" herein means an inference for a target decoded signal. The MPA is an iterative decoding algorithm that uses multiple iterations of information transfer between a data stream and a resource unit to achieve decoding convergence. Theoretically, an SCMA decoding problem is an uncertainty problem of a polynomial complexity. As an iterative greedy algorithm, the MPA has a relatively low algorithm complexity, because frequency-domain sparse spreading of a signal is used.

Figure 3:
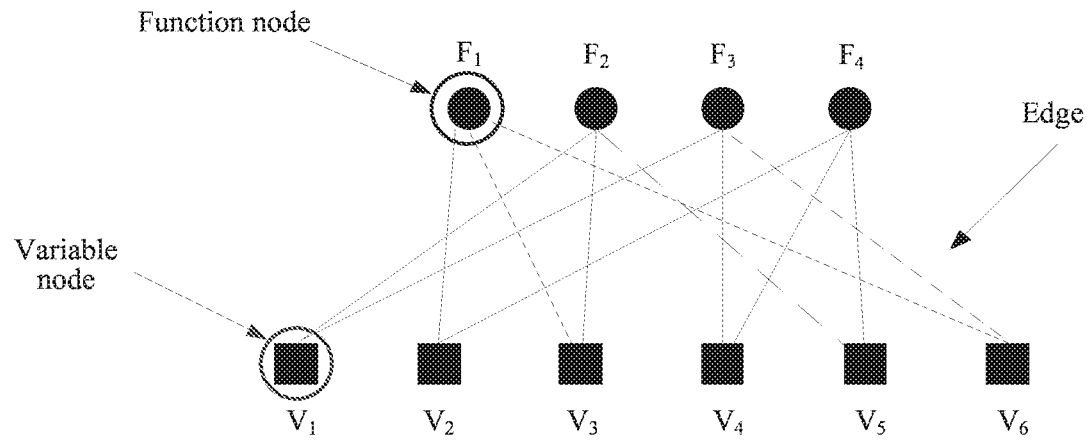
FIG. 3 is a schematic diagram of SCMA decoding.

As shown in FIG. 3, it is assumed that nodes corresponding to four resource units are referred to as resource units, and may also be referred to as function nodes (FN). It is assumed that nodes corresponding to six users are referred to as data streams, or the nodes may be referred to as variable nodes (VN) herein. The users herein may be users different from each other, or may be less than six users, where two data streams are from one user. For ease of description of a decoding algorithm, variable nodes and function nodes are used for description below. A connection line between an FN and a VN is referred to as an "edge". Some variables terms used in SCMA are listed in the following table.

| Variables terms | Descriptions |
|---|---|
| J = 4 | Four FNs |
| K = 6 | Six VNs |
| $d_f$ = 3 | Each FN is connected to three VNs. |
| $d_v$ = 2 | Each VN is connected to two FNs. |
| M = $|C_x|$ = 4 | A modulation order of a user source, for example, M = 4 is corresponding to QPSK. |
| $ap^{(init)}$ = 1/M | An initial state of the VNs is a prior probability of each constellation point |
| $N_i$ = 5 | A quantity of iterations in MPA decoding |

In the MPA, a quantity of complex operations is performed before performing an interation. The complex operation is represented by f(.), and a specific expression of the complex operation is:

$$f(y_n, \alpha, \beta, i, N_{o,n}, H_n) = \frac{-1}{N_{o,n,r1}} \|y_{n,r1} - (h_{n,a,r1}C_a(\alpha) + h_{n,b,r1}C_b(\beta) + h_{n,k,r1}C_k(i))\|^2 - \frac{-1}{N_{o,n,r2}} \|y_{n,r2} - (h_{n,a,r2}C_a(\alpha) + h_{n,b,r2}C_b(\beta) + h_{n,k,r2}C_k(i))\|^2$$

where $y_{n,r1}$ is a signal received by a receive end on an $n^{th}$ resource unit and an $r_1^{th}$ receive antenna, $h_{n,k,r1}$ is an uplink channel corresponding to user k on the $n^{th}$ resource unit and the $r_1^{th}$ receive antenna, $C_k(i)$ is an $i^{th}$ code word in an SCMA codebook of user k, and $N_{o,n,r1}$ is noise on the $n^{th}$ resource unit and the $r_1^{th}$ receive antenna. It may be learned that calculation of the function f(.) requires four input information items, that is, a received signal y, a channel estimate h, a noise estimate N, and codebook information corresponding to each user. The calculated f(.) needs to be stored herein, for subsequent use by a module during an update. After the calculation of f(.) is complete, the MPA needs to perform multiple iterations to achieve convergence. Each iteration process may be divided into two steps: an FN node update and a VN node update. After the iterations are complete, an LLR needs to be calculated and output to a subsequent Turbo decoder.

First, in the MPA, a quantity of complex operations is performed, before performing an iteration. The complex operation is represented by f(.), and a specific expression of the complex operation is:

$$f(y_n, \alpha, \beta, i, N_{o,n}, H_n) =$$
$$\frac{-1}{N_{o,n,r1}}\|y_{n,r1} - (h_{n,a,r1}C_a(\alpha) + h_{n,b,r1}C_b(\beta) + h_{n,k,r1}C_k(i))\|^2 -$$
$$\frac{-1}{N_{o,n,r2}}\|y_{n,r2} - (h_{n,a,r2}C_a(\alpha) + h_{n,b,r2}C_b(\beta) + h_{n,k,r2}C_k(i))\|^2$$

where $y_{n,r1}$ is a signal received by a receive end on an $n^{th}$ resource unit and an $n_1^{th}$ receive antenna, $h_{n,k,r1}$ is an uplink channel corresponding to user k on the $n^{th}$ resource unit and the $r_1^{th}$ receive antenna, $C_k(i)$ is an $i^{th}$ code word in an SCMA codebook of user k, and $N_{o,n,r1}$ is noise on the $n^{th}$ resource unit and the $n^{th}$ receive antenna. It may be learned that calculation of the function f(.) requires three input information items, that is, a received signal y, a channel estimate h, and a noise estimate N. The calculated f(.) needs to be stored herein, for subsequent use by a module during an update.

Then, after the calculation of f(.) is complete, the MPA needs to perform multiple iterations to achieve convergence. Each iteration process may be divided into two steps: an FN node update and a VN node update.

Finally, after the iterations are complete, an LLR needs to be calculated and output to a subsequent Turbo decoder. The function node and variable node updates and an LLR calculation module are described in detail below.

Function Node FN Update

An FN separately collects statistics on a posterior probability of each SCMA code word for each connected VN according to posterior probabilities transferred by the VNs (connected to the FN), and transfers a probability message to a corresponding VN.

Figure 4:
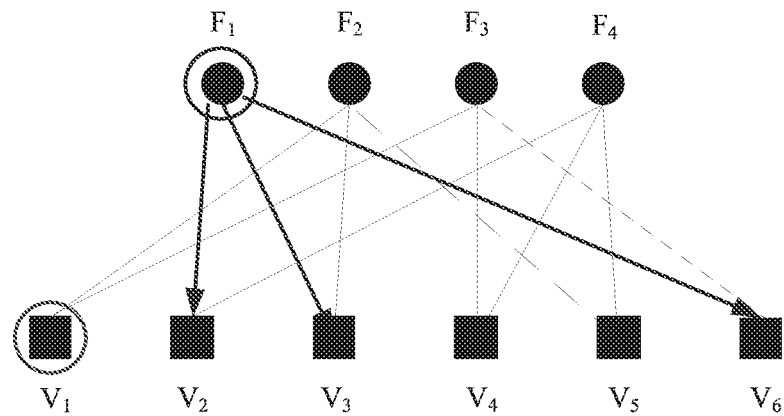
FIG. 4 is a schematic diagram of a function node update.

Referring to FIG. 4, an update of three edges is used as an example. Each FN is connected to $d_f$=3 VNs. In each iteration process, the FN needs to update information about the three connected VNs. The FN marked in FIG. 4 is defined as $FN_n$ herein, and the three VNs connected to the FN are respectively referred to as $VN_k$, $VN_a$, and $VN_b$. In this case, an equation of updating information from $FN_n$ to $VN_k$ is:

$$I_{c_n \to q_k}(i) = \sum_{\alpha=1}^{|C_a|} \sum_{\beta=1}^{|C_b|} \phi_n(y_n, \alpha, \beta, i, N_{o,n}, H_n)(I_{q_a \to c_n}(\alpha)I_{q_b \to c_n}(\beta)), \quad (1)$$

$$i = 1, \ldots, |C_k|$$

where
i represents an $i^{th}$ code word in an SCMA codebook corresponding to $VN_k$;
$y_n$ is a received signal on an $n^{th}$ resource unit;
$N_{o,n}$ noise power estimation on the $n^{th}$ resource unit;
$H_n$ is a channel estimation matrix from all VNs to $FN_n$;
α represents an $\alpha^{th}$ code word in an SCMA codebook corresponding to $VN_a$, and $I_{q_a \to c_n}(\alpha)$ represents information transferred from $VN_a$ to $FN_n$; and β represents a $\beta^{th}$ code word in an SCMA codebook corresponding to $VN_b$, and $I_{q_b \to c_n}(\beta)$ represents information transferred from $VN_b$ to $FN_n$.

A function $\varphi_n(.)$ represents a conditional channel probability (CCP) of $C_k(i)$, and a specific expression is:

$$\phi_n(y_n, \alpha, \beta, i, N_{o,n}, H_n) = \exp(f(y_n, \alpha, \beta, i, N_{o,n}, H_n)) = \quad (3)$$
$$\exp\left(\frac{-1}{N_{o,n,r1}}\|y_{n,r1} - (h_{n,a,r1}C_a(\alpha) + h_{n,b,r1}C_b(\beta) + h_{n,k,r1}C_k(i))\|^2 - \right.$$
$$\left.\frac{-1}{N_{o,n,r2}}\|y_{n,r2} - (h_{n,a,r2}C_a(\alpha) + h_{n,b,r2}C_b(\beta) + h_{n,k,r2}C_k(i))\|^2\right).$$

Likewise, information transferred from $FN_n$ to $VN_a$ and information transferred from $FN_n$ to $VN_b$ may be respectively obtained by means of calculation by using the following equations:

$$I_{c_n \to q_a}(i) = \sum_{\kappa=1}^{|C_k|} \sum_{\beta=1}^{|C_b|} \phi_n(y_n, \kappa, \beta, i, N_{o,n}, H_n)(I_{q_k \to c_n}(\kappa)I_{q_b \to c_n}(\beta)),$$

$$i = 1, \ldots, |C_a|$$

$$I_{c_n \to q_b}(i) = \sum_{\kappa=1}^{|C_k|} \sum_{\alpha=1}^{|C_a|} \phi_n(y_n, \kappa, \alpha, i, N_{o,n}, H_n)(I_{q_k \to c_n}(\kappa)I_{q_a \to c_n}(\alpha)),$$

$$i = 1, \ldots, |C_b|$$

After n=1 . . . 4 is traversed, updating of all function nodes ($FN_1$ to $FN_4$) is completed.

Variable Node VN Update

After all the FNs are updated, a VN needs to collect statistics on a posterior probability of each SCMA code word according to posterior probabilities transferred by FNs (connected to the VN), and transfer a probability message to a corresponding FN.

Figure 5:
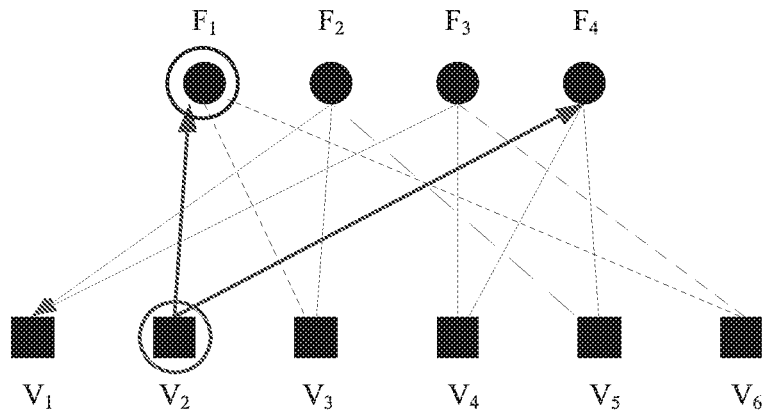
FIG. 5 is a schematic diagram of a variable node update.

Referring to FIG. 5, an update of two edges is used as an example. Each VN is connected to $d_v$=2 FNs. In an iteration process, the VN needs to update information about the two connected FNs at the same time. Using $VN_k$ as an example, an equation of updating information from $VN_k$ to $FN_n$ is:

$$I_{q_k \to c_n}(i) = \text{normalize}(\alpha p_k(i)I_{c_{!n} \to q_k}(i)), i=1, \ldots, |C_k|$$

where !n represents other FNs that are connected to $VN_k$ in addition to $FN_n$, $\alpha p_k(i)$ represents a prior probability of $\Pr\{\hat{c}_k=C_k(i)\}$, and an initial prior probability is set to $$I_{q_k \to c_n}^{(init)} = \left(\frac{1}{|C_k|}, \ldots, \frac{1}{|C_k|}\right).$$

Because generally $\alpha p_k(i)$ is a constant, an update equation for the VNs may be simplified as:

$$I_{q_k \to c_n}(i) = \text{normalize}(I_{c_{!n} \to q_k}(i)), i=1, \ldots, |C_k| \quad (4)$$

After k=1 . . . −6 is traversed, updating of all the function nodes ($VN_1$ to $VN_4$) is complete.

MPA Decoding Output

When performance convergence is achieved by repeating the iterative FN update and VN update processes, for example, after an $N_i^{th}$ iteration, LLR (Log Likelihood Ratio) soft decision decoding output of an information symbol needs to be performed on an MPA decoding result to obtain an output, and the output is transferred to the Turbo decoder as an input. Specific steps are as follows:

First, each VN calculates probabilities of M SCMA code words according to information transferred by two FNs connected to the VN. Using $VN_k$ as an example, $$Q_k(i) = ap_k(i) \prod_{m \in Z(k)} I_{c_m \to q_k}(i), i = 1, \ldots, |C_k|$$

Then, an LLR value of an $x^{th}$ bit value $u_{i,x}$ in a QPSK symbol corresponding to each SCMA code word $Q_k(i)$ is calculated.

$$LLR_x = \log\left(\frac{\sum_{i:u_{i,x}=0} \sum Q_k(i)}{\sum_{i:u_{i,x}=1} Q_k(i)}\right) = \log\left(\sum_{i:u_{i,x}=0} Q_k(i)\right) - \log\left(\sum_{i:u_{i,x}=1} Q_k(i)\right) \quad (5)$$

The decoder also makes a hard decision by comparing $LLR_x$ with 0. The specific algorithm process of the MPA is summarized as follows:

---

< Descriptions of MPA algorithm>

Initialize $I_{c_n \to q_k}(i) = 0$, $I_{q_a \to c_n}(i) = 1/M$, $i = 1, \ldots, |C_k|$ for t = 1 to Niter FN update
$$\begin{cases} \text{for } n = 1 \text{ to } J \\ \quad \text{if } t = 1 \text{ then} \\ \quad\quad \text{Calculate } f(y_n, \alpha, \beta, i, N_{o,n}, H_n) \text{ using equation (3)} \\ \quad \text{end if} \\ \quad \text{for } k = 1 \text{ to } K \\ \quad\quad I_{c_n \to q_k}(i) \leftarrow \sum_{\alpha=1}^{|C_a|} \sum_{\beta=1}^{|C_b|} \phi_n(y_n, \alpha, \beta, i, N_{o,n}, H_n) (I_{q_a \to c_n}(\alpha) I_{q_b \to c_n}(\beta)), \forall i \\ \quad \text{end for} \\ \text{end for} \end{cases}$$

VN update
$$\begin{cases} \text{for } k = 1 \text{ to } K \\ \quad \text{for } n = 1 \text{ to } J \\ \quad\quad I_{q_k \to c_n}(i) \leftarrow \text{normalize}(I_{c_{1n} \to q_k}(i)), \forall i \\ \quad \text{end for} \\ \text{end for} \end{cases}$$

end for $$LLR_x \leftarrow \log\left(\sum_{i: u_{i,x}=0} \prod_{m \in Z(k)} I_{c_m \to q_k}(i)\right) - \log\left(\sum_{i: u_{i,x}=1} \prod_{m \in Z(k)} I_{c_m \to q_k}(i)\right)$$

---

It should be understood that the SCMA system mentioned above is an example of a communications system to which a data transmission method and device of the present invention are applicable. The foregoing description of SCMA, such as principles of codebook mapping and SCMA decoding, an SCMA codebook mapping process of data, and an SCMA decoding process, is applicable to the following embodiments, and details are not described in the following embodiments again. In addition, the present invention is not limited to the SCMA system, and other communications systems that can enable a terminal device to perform data transmission by using a same time-frequency resource in a same period of time also fall within the protection scope of the present invention.

Although processing steps are numbered in method embodiments described below, the numbers do not represent a sequential order, and are not a limitation on the time order.

Persons skilled in the art may use another name to refer to an SCMA codebook in the embodiments. For brevity of description, for a signal described in the following embodiments, some technical processing procedures that can be understood by persons skilled in the art may be omitted. For example, before a modulation symbol obtained after SCMA codebook mapping is sent over an air interface, an operation such as up-conversion needs to be performed.

There are many manners for implementing information about an SCMA codebook during implementation. Examples are provided below.

1. The information about the SCMA codebook may be an index that indicates the SCMA codebook.

2. The information about the SCMA codebook may include codebook cluster information, codebook set information, and codebook information. The codebook cluster information is used to indicate a codebook cluster to which the SCMA codebook belongs; the codebook set information is used to indicate information about a codebook set in the codebook cluster to which the SCMA codebook belongs; the codebook information is used to indicate information about a codebook in the codebook set to which the SCMA codebook belongs.

3. The information about the SCMA codebook may include codebook set information and codebook information. The codebook set information is used to indicate information about a codebook set to which the SCMA codebook belongs; the codebook information is used to indicate information about a codebook in the codebook set to which the SCMA codebook belongs.

4. The information about the SCMA codebook may include codebook cluster information and codebook information. The codebook cluster information is used to indicate a codebook cluster to which the SCMA codebook belongs; the codebook information is used to indicate information about a codebook in the codebook cluster to which the SCMA codebook belongs.

5. The information about the SCMA codebook may include characteristic matrix information, characteristic sequence information, and codebook information. The characteristic matrix information is used to indicate a characteristic matrix. The characteristic sequence information is used to indicate a characteristic sequence in the characteristic matrix. The codebook information is used to indicate information about a codebook in one or more codebooks corresponding to the characteristic sequence.

6. The information about the SCMA codebook may include characteristic sequence information and codebook information. The characteristic sequence information is used to indicate a characteristic sequence. The codebook information is used to indicate information about a codebook in one or more codebooks corresponding to the characteristic sequence.

7. The information about the SCMA codebook may include characteristic matrix information and codebook information. The characteristic matrix information is used to indicate a characteristic matrix; the codebook information is used to indicate information about a codebook in one or more codebooks corresponding to the characteristic matrix.

The information may be sent by using DCI, or may be sent by using another message such as a broadcast message, or may be sent by using downlink data.

The sending may be implemented by means of broadcast or directional transmission.

Figure 6:
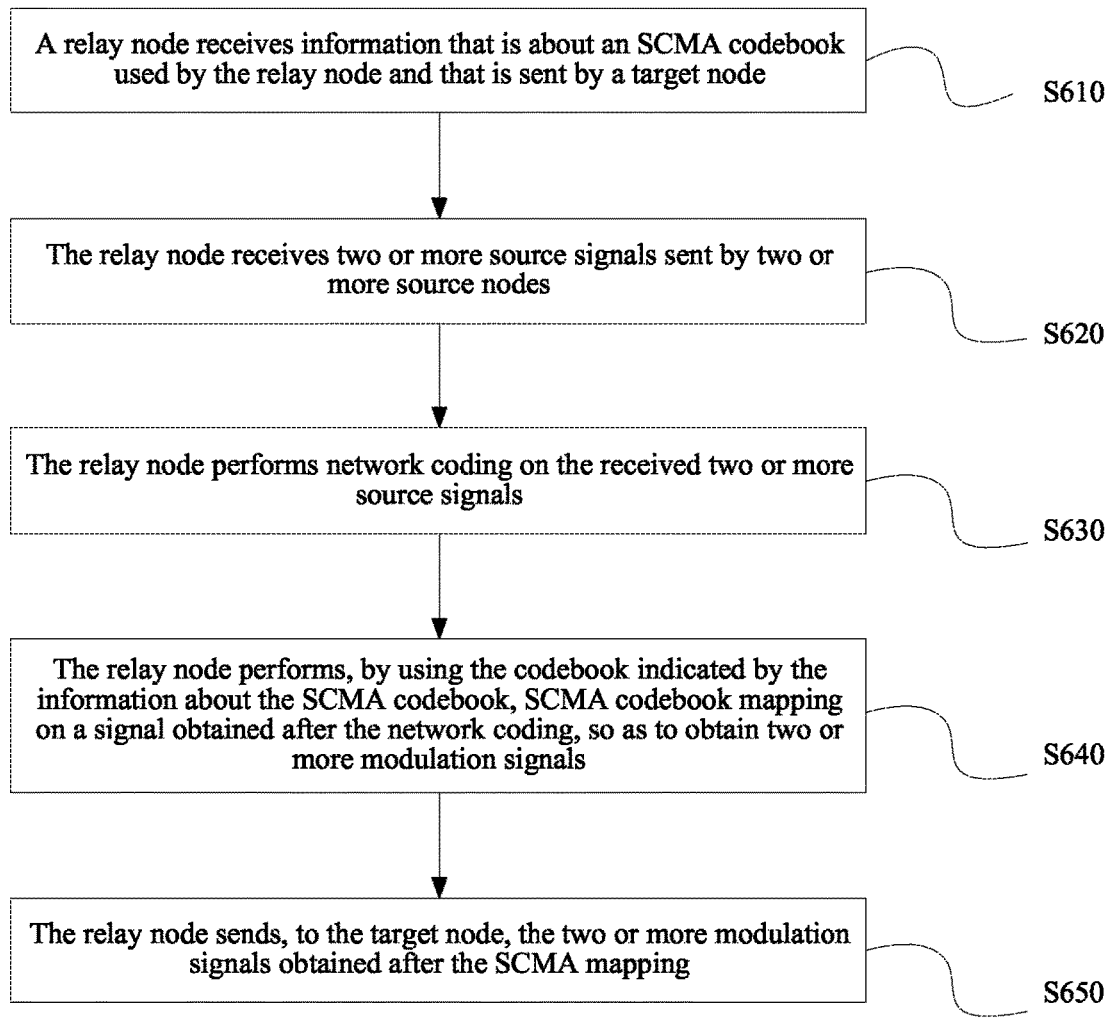
FIG. 6 is a schematic flowchart of a data transmission method according to an embodiment of the present invention.

FIG. 6 provides a data transmission method. The method may be performed by a relay node and specifically includes the following steps.

S610: The relay node receives information that is about an SCMA codebook used by the relay node and that is sent by a destination node, where the SCMA codebook includes two or more code words, the code word is a multi-dimensional complex vector and is used to represent a mapping relationship between data and at least two modulation symbols, and the at least two modulation symbols include at least one zero modulation symbol and at least one non-zero modulation symbol. Optionally, the information about the codebook may be carried in a downlink control information (DCI) message, or may be carried in another message. This is not limited herein. The information about the SCMA codebook used by the relay node is a codebook allocated to and used by the relay node. Similar descriptions in the following embodiments may be understood in a similar manner.

S620: The relay node receives two or more source signals sent by two or more source nodes.

S630: The relay node performs network coding on the received two or more source signals. Optionally, the network coding may be exclusive-OR coding, or may be physical layer coding, or may be another network coding technology. This is not limited herein.

S640: The relay node performs, by using the codebook indicated by the information about the SCMA codebook, SCMA codebook mapping on a signal obtained after the network coding, so as to obtain a relay signal, where the relay signal is at least two modulation symbols, and the least two modulation symbols may include at least one zero modulation symbol and at least one non-zero modulation symbol.

S650: The relay node sends, to the destination node, the relay signal obtained after the SCMA codebook mapping. According to the foregoing description of the SCMA technology, persons skilled in the art may understand that sending a relay signal may be sending a non-zero modulation symbol obtained after SCMA codebook mapping. Optionally, a time-frequency resource used by the relay node to send the relay signal is also used by at least one source node to send a source signal obtained by performing SCMA codebook mapping by using an SCMA codebook used by the at least one source node.

In this embodiment of the present invention, a relay node may perform network coding on a source signal, then perform SCMA codebook mapping to obtain a relay signal, and send the relay signal. In this way, when the relay node sends the relay signal, a source node can also send, on a same time-frequency resource, a source signal obtained after SCMA codebook mapping. Compared with the prior art in which a source node cannot send a source signal on a same time-frequency resource when a relay node transmits a relay signal to a destination node, a quantity of signals transmitted in a system is increased, and transmission efficiency is improved.

Optionally, the relay node receives information that is about source nodes requiring the relay node to perform network coding and that is sent by a destination node. The relay node further determines whether the received signals are sent by the source nodes requiring the relay node to perform network coding. If the received signals are sent by the source nodes requiring the relay node to perform network coding, the network coding is performed on the received source signals. Optionally, the information about the source nodes requiring the relay node to perform network coding may be UE ID information, and may be carried in a downlink control information (DCI) message, or may be carried in another message such as a broadcast message or a message carrying downlink data. This is not limited herein. By using the information about the source nodes requiring the relay node to perform network coding, the relay node only needs to perform network coding on the signals from the source nodes requiring the relay node to perform network coding, so that transmission flexibility is improved.

Figure 7:
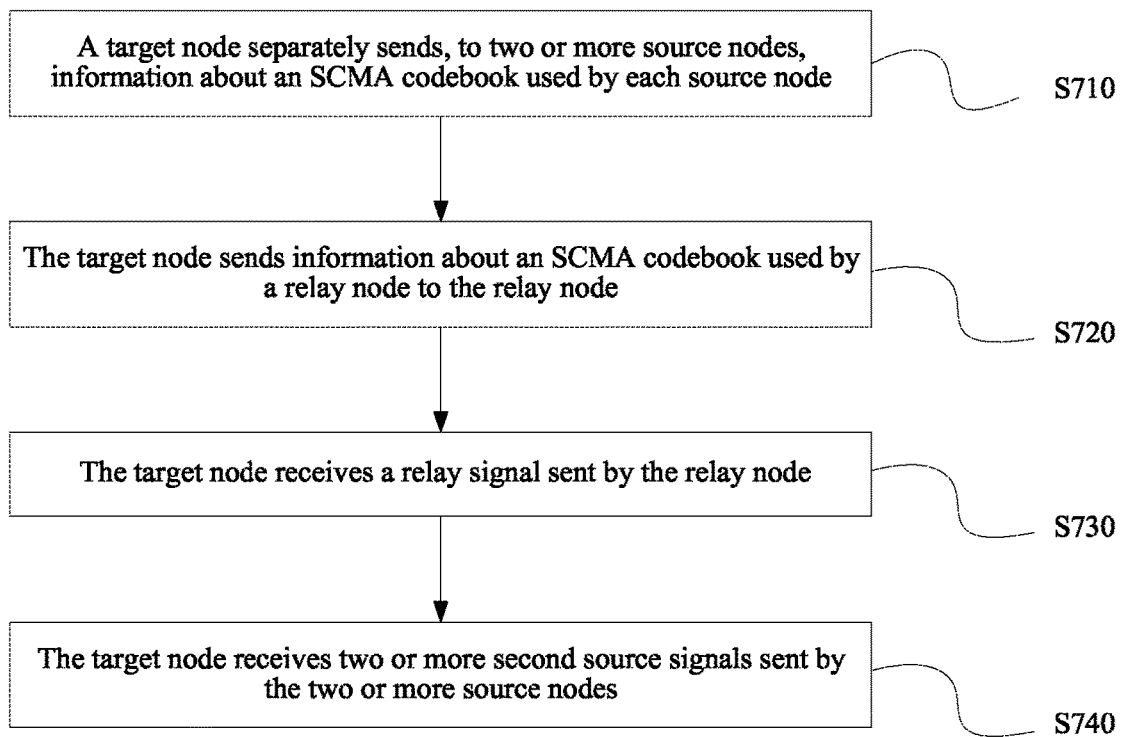
FIG. 7 is a schematic flowchart of a data transmission method according to an embodiment of the present invention.

FIG. 7 provides a data transmission method. The method may be performed by a destination node and specifically includes the following steps.

S710: The destination node separately sends, to two or more source nodes, information about an SCMA codebook used by each source node, where the SCMA codebook includes two or more code words, the code word is a multi-dimensional complex vector and is used to represent a mapping relationship between data and at least two modulation symbols, and the at least two modulation symbols include at least one zero modulation symbol and at least one non-zero modulation symbol.

S720: The destination node sends information about an SCMA codebook used by a relay node to the relay node.

S730: The destination node receives a relay signal sent by the relay node, where the relay signal sent by the relay node is at least two modulation symbols obtained by the relay node after the relay node receives two or more first source signals sent by the two or more source nodes, performs network coding on the received two or more first source signals, and performs, by using the codebook indicated by the information about the SCMA codebook used by the relay node, SCMA codebook mapping on a signal obtained after the network coding, and the at least two modulation symbols may include at least one zero modulation symbol and at least one non-zero modulation symbol.

S740: The destination node receives a second source signal sent by at least one of the two or more source nodes, where the second source signal is obtained by the source node by performing SCMA codebook mapping by using the codebook indicated by the information about the SCMA codebook used by the source node, and the second source signal and the relay signal are sent by using a same time-frequency resource.

In this embodiment of the present invention, a destination node may receive a source signal sent by a source node and receive a relay signal from a relay node at the same time, so that a quantity of received signals is increased, and transmission efficiency is improved.

Optionally, before the receiving, by the destination node, a relay signal sent by the relay node, the method includes: receiving, by the destination node, a first source signal sent by at least one of the source nodes. After the receiving, by the destination node, a relay signal sent by the relay node, the method further includes: performing, by the destination node, network decoding on the received first source signal and relay signal. Because the relay signal is obtained by means of network coding according to the first source signal, network decoding may be performed by using the relay signal and the first source signal, thereby increasing a success rate of decoding.

Optionally, the destination node sends, to the relay node, information about source nodes requiring the relay node to perform network coding, where the information about the source nodes is used by the relay node to determine whether to perform network coding on the received source signals. Optionally, the information about the source nodes may be UE IDs. Optionally, the information about the source nodes requiring the relay node to perform network coding is carried in a DCI message for sending, or may be carried in another message for sending. This is not limited herein. By using the information about the source nodes requiring the relay node to perform network coding, flexibility of performing network coding by the relay node is improved, and therefore flexibility of a relay system is improved.

Optionally, the information about the SCMA codebook is carried in a DCI message for sending, or may be carried in another message.

Figure 8:
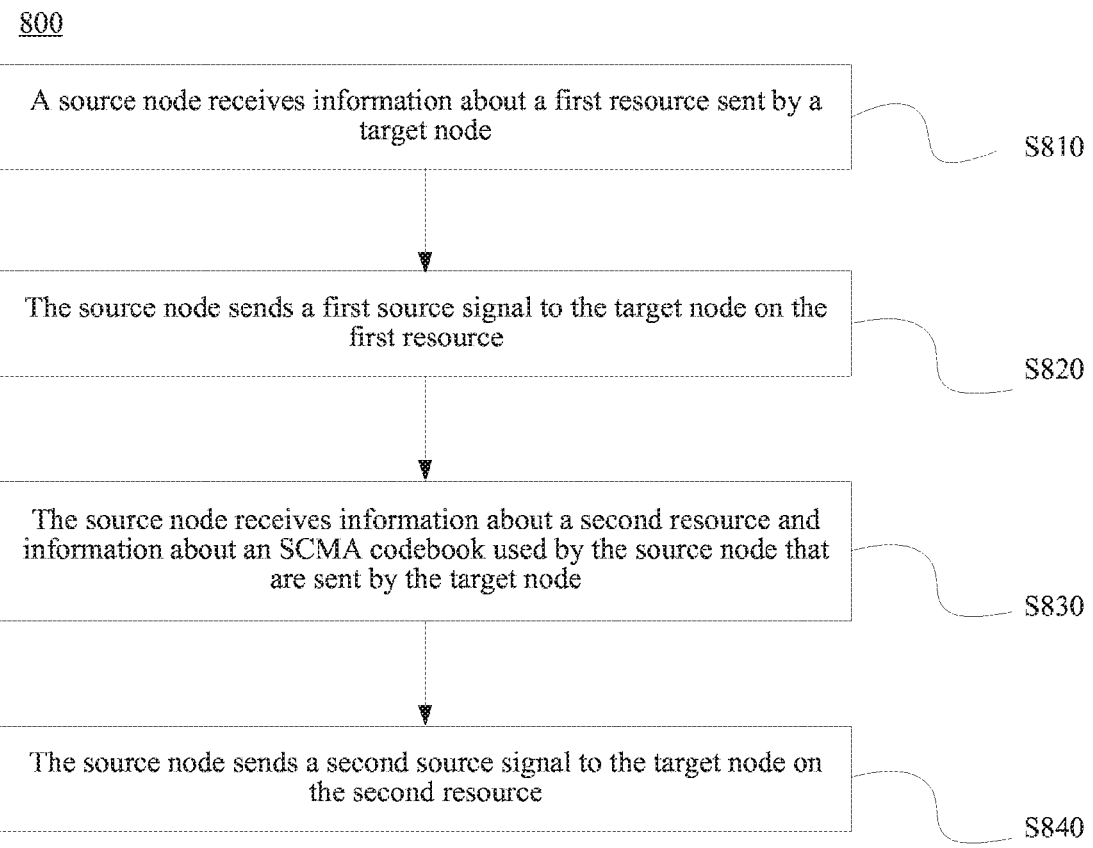
FIG. 8 is a schematic flowchart of a data transmission method according to an embodiment of the present invention.

FIG. 8 provides a data transmission method. The method may be performed by a source node and specifically includes the following steps.

S810: The source node receives information about a first resource sent by a destination node.

S820: The source node sends a first source signal to the destination node or a relay node or both on the first resource, where the first source signal may be a source signal obtained by performing non-SCMA codebook mapping, and for example, may be a source signal obtained by performing constellation mapping.

S830: The source node receives information about a second resource and information about an SCMA codebook used by the source node that are sent by the destination node, where the SCMA codebook includes two or more code words, the code word is a multi-dimensional complex vector and is used to represent a mapping relationship between data and at least two modulation symbols, and the at least two modulation symbols include at least one zero modulation symbol and at least one non-zero modulation symbol.

S840: The source node sends the second source signal to the destination node or the relay node or both on the second resource, where the second source signal is at least two modulation symbols obtained by the source node by performing SCMA codebook mapping on data by using the SCMA codebook indicated by the information about the SCMA codebook, and the at least two modulation symbols may be referred to as a source signal or a source signal obtained after SCMA codebook mapping.

Optionally, a time-frequency resource used by the source node to send the at least two modulation symbols obtained after the SCMA codebook mapping is used by at least one relay node to send a relay signal obtained after SCMA codebook mapping.

Optionally, the information about the first resource is carried in first information DCI, and the information about the second resource and the information about the SCMA codebook used by the source node are carried in second DCI.

In this embodiment of the present invention, a source node may send, according to information sent by a destination node, a signal obtained by performing SCMA codebook mapping or a signal obtained by performing non-SCMA codebook mapping, so that flexible transmission is implemented.

Figure 9:
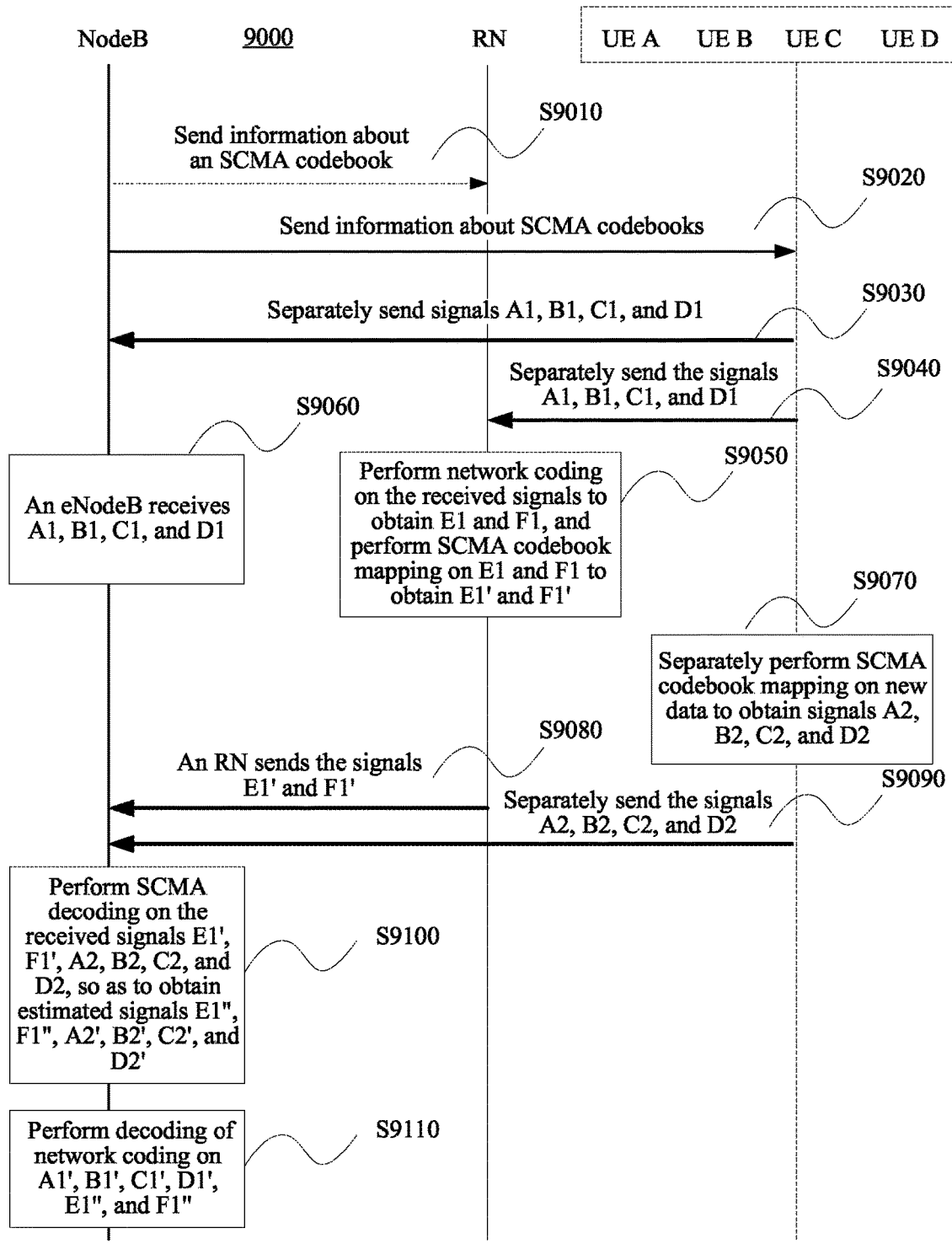
FIG. 9 is a schematic flowchart of a data transmission method according to an embodiment of the present invention.

FIG. 9 provides a data transmission method. The transmission method is performed by a source node, a relay node, and a destination node. Although there are multiple entities for executing the solution described in FIG. 9, it should be understood by persons skilled in the art that a single execution entity may execute the solution in alternative embodiments. Therefore, the method may be decomposed into multiple independent solutions that are implemented by single execution entities. For example, the method may be decomposed into a solution implemented by the relay node, a solution implemented by the source node, and a solution implemented by the destination node. These independent solutions are not described herein again.

In this embodiment, the destination node is, for example, a base station NodeB, and source nodes are, for example, two or more terminal devices UEs. In this embodiment, the source nodes are specifically UE A, UE B, UE C, and UE D. The relay node is referred to as RN for short, and may also be referred to as a relay station.

It is assumed that an SCMA codebook used in this embodiment is applicable to coding of 2-bit transmit data of six users, and it is assumed that six data streams reuse four REs. The users herein may be users different from each other, or may be less than six users, where two data streams are from one user. Therefore, the SCMA codebook is set so that data of four UEs, that is, data streams of UE A, UE B, UE C, and UE D, and two groups of data obtained by the RN by performing network coding, form a group of six data streams that reuse four REs.

The method is described in detail as follows.

S9010: The NodeB sends information about an SCMA codebook used by the RN node to the RN. It is assumed that SCMA codebooks used by the RN are:

$$C5 = \begin{bmatrix} c5_{1,1} & c5_{1,2} & c5_{1,3} & c5_{1,4} \\ c5_{2,1} & c5_{2,2} & c5_{2,3} & c5_{2,4} \\ c5_{3,1} & c5_{3,2} & c5_{3,3} & c5_{3,4} \\ c5_{4,1} & c5_{4,2} & c5_{4,3} & c5_{4,4} \end{bmatrix}$$

$$C6 = \begin{bmatrix} c6_{1,1} & c6_{1,2} & c6_{1,3} & c6_{1,4} \\ c6_{2,1} & c6_{2,2} & c6_{2,3} & c6_{2,4} \\ c6_{3,1} & c6_{3,2} & c6_{3,3} & c6_{3,4} \\ c6_{4,1} & c6_{4,2} & c6_{4,3} & c6_{4,4} \end{bmatrix}$$

Optionally, the NodeB may further send information about source nodes requiring an RN to perform network coding to the RN, to indicate that network coding needs to be performed on source signals received from these source nodes. The information about the source nodes and the information about the SCMA codebook used by the RN may be carried in a same message for sending, or the information about the source nodes may be carried in another message. A type of a message may be a DCI message, or may be another message. In this embodiment, the information about the source nodes may be UE information such as UE ID information.

S9020: The NodeB separately sends, to the nodes UE A, UE B, UE C, and UE D, information about SCMA codebooks used by UE A, UE B, UE C, and UE D. There are many manners for implementing the information during implementation. The multiple manners used in the foregoing step 1 may be used.

It is assumed that an SCMA codebook sent by the NodeB to UE A is:

$$C1 = \begin{bmatrix} c1_{1,1} & c1_{1,2} & c1_{1,3} & c1_{1,4} \\ c1_{2,1} & c1_{2,2} & c1_{2,3} & c1_{2,4} \\ c1_{3,1} & c1_{3,2} & c1_{3,3} & c1_{3,4} \\ c1_{4,1} & c1_{4,2} & c1_{4,3} & c1_{4,4} \end{bmatrix}$$

It is assumed that an SCMA codebook sent by the NodeB to UE B is:

$$C2 = \begin{bmatrix} c2_{1,1} & c2_{1,2} & c2_{1,3} & c2_{1,4} \\ c2_{2,1} & c2_{2,2} & c2_{2,3} & c2_{2,4} \\ c2_{3,1} & c2_{3,2} & c2_{3,3} & c2_{3,4} \\ c2_{4,1} & c2_{4,2} & c2_{4,3} & c2_{4,4} \end{bmatrix}$$

It is assumed that an SCMA codebook sent by the NodeB to UE C is:

$$C3 = \begin{bmatrix} c3_{1,1} & c3_{1,2} & c3_{1,3} & c3_{1,4} \\ c3_{2,1} & c3_{2,2} & c3_{2,3} & c3_{2,4} \\ c3_{3,1} & c3_{3,2} & c3_{3,3} & c3_{3,4} \\ c3_{4,1} & c3_{4,2} & c3_{4,3} & c3_{4,4} \end{bmatrix}$$

It is assumed that an SCMA codebook sent by the NodeB to UE D is:

$$C4 = \begin{bmatrix} c4_{1,1} & c4_{1,2} & c4_{1,3} & c4_{1,4} \\ c4_{2,1} & c4_{2,2} & c4_{2,3} & c4_{2,4} \\ c4_{3,1} & c4_{3,2} & c4_{3,3} & c4_{3,4} \\ c4_{4,1} & c4_{4,2} & c4_{4,3} & c4_{4,4} \end{bmatrix}$$

S9030 and S9040: UE A, UE B, UE C, and UE D separately send first source signals A1, B1, C1, and D1 to the NodeB and the RN. The sending may be implemented by means of broadcast or directional transmission, and the sending actions may be performed by the UEs by using a same time-frequency resource. Using UE A and UE B as an example, UE A sends the source signal A1 to the RN or the NodeB by means of broadcast, or UE A sends the source signal A1 to the RN or the NodeB by means of directional transmission, and UE B may send the source signal B1 by using a same time-frequency resource as that used by UE A. For example, the UE B sends the source signal B1 in a same timeslot as that in which UE A sends the source signal A1.

The first source signals A1, B1, C1, and D1 may be modulation symbols obtained by UE A, UE B, UE C, and UE D by performing SCMA codebook mapping on data according to the codebook indicated by the information about the SCMA codebook sent by the NodeB in step 9020. If this manner is used, UE A, UE B, UE C, and UE D may separately send A1, B1, C1, and D1 by using a same time-frequency resource.

Alternatively, the first source signals A1, B1, C1, and D1 may be modulation symbols obtained by UE A, UE B, UE C, and UE D according to a constellation modulation technology, rather than modulation symbols obtained by performing SCMA codebook mapping on data according to the information about SCMA codebook sent by the NodeB in step 9020.

Certainly, persons skilled in the art may understand from the description herein, that during implementation, the modulation symbols cannot actually become the sent first source signals A1, B1, C1, and D1 until some technical processing such as IFFT or up-conversion is performed on the modulation symbols. In this embodiment of the present invention, for brevity and clarity of description of the solution, some technical details are omitted. The omission does not affect understanding and implementing of the solution of the present invention according to the description by persons skilled in the art.

S9050: The RN receives the first source signals A1, B1, C1, and D1 sent separately by UE A, UE B, UE C, and UE D, performs network coding on the received source signals, and performs SCMA codebook mapping on a signal obtained after the network coding, so as to obtain at least two modulation symbols. The description of performing network coding on the received signals may be understood as a description manner used for describing the solution clearly and briefly. During implementation, persons skilled in the art may understand from the description herein that the RN performs decoding on received signals of the first source signals A1, B1, C1, and D1 to obtain estimated signals A1', B1', C1', and D1' of the received signals. If the received A1, B1, C1, and D1 are obtained by performing SCMA codebook mapping, SCMA decoding needs to be performed. Or, if the received A1, B1, C1, and D1 are not obtained by performing the SCMA codebook mapping, SCMA decoding does not need to be performed.

Then, network coding is performed on A1', B1', C1', and D1'. There are multiple manners for performing network coding. For example, a MAC layer bit exclusive-OR manner may be used to perform network coding. A principle for performing network coding may be simply represented by E1=A1'⊕B1' and F1=C1'⊕D1'. Certainly, alternatively, a physical layer network coding manner may be used on a physical layer. The following table shows a relationship table about performing physical layer network coding on physical layer symbols. The table describes how the relay node performs physical layer network coding on A1' and B1'. For example, in the first row, if A'=1 and B'=1, it is considered that a symbol received by the relay node is 2. When performing physical layer network coding, the relay node may learn, according to the following mapping relationship, that a relay signal that needs to be sent is 1.

| Symbol from source node A1' | Symbol from source node B1' | Symbol received by a relay node | Relay symbol to be sent by the relay node |
|---|---|---|---|
| 1 | 1 | 2 | 1 |
| 1 | −1 | 0 | −1 |
| −1 | 1 | 0 | −1 |
| −1 | −1 | −2 | 1 |

Then, according to the codebook indicated by the information about the SCMA codebook delivered by the NodeB in step 9010, SCMA codebook mapping is performed on E1 and F1, so as to obtain E1' and an F1'. It is assumed that E1=00. Modulation symbols obtained by performing SCMA codebook mapping according to the SCMA codebook C5 in the two SCMA codebooks delivered in step 9010 may be the first code word in the codebook C5. For signal F1, the SCMA codebook C6 is used, and F1' is obtained, with a mapping principle of F1 being the same as that of E1.

Optionally, if the RN receives information that is about source nodes requiring the RN to perform network coding and that is sent by the NodeB, the RN needs to determine whether the received source signals are sent by the source nodes requiring the relay node to perform network coding. If the received source signals are sent by the source nodes requiring the relay node to perform network coding, the network coding is performed on the received source signals. Or, if the received source signals are not sent by the source nodes requiring the relay node to perform network coding, the network coding is not performed on the received source signals. In this embodiment of the present invention, it is assumed that the RN determines that the received source signals are sent by the source nodes UE A, UE B, UE C, and UE D requiring the RN to perform network coding. In this case, during implementation, the RN may perform network coding such as exclusive-OR coding on the estimated signals A1', B1', C1', and D1'of the received signals, so as to obtain E1 and F1; and then, perform SCMA codebook mapping to obtain E1' and F1'. E1' and F1' are at least two modulation symbols, and the at least two modulation symbols may include at least one zero modulation symbol and at least one non-zero modulation symbol. E1' and the F1' may be relay signals sent by the RN to the NodeB.

S9060: The NodeB receives the first source signals A1, B1, C1, and D1 sent separately by the UE A, UE B, UE C, and UE D. Persons skilled in the art may understand that generally, received source signals may be different from the first source signals A1, B1, C1, and D1 because some channel interference may be introduced. For brevity and clarity of description, they are not distinguished as different expressions. During implementation, persons skilled in the art may understand from the description herein that the RN performs decoding on received signals of the first source signals A1, B1, C1, and D1 to obtain estimated signals A1', B1', C1', and D1' of the received nodes. If the received A1, B1, C1, and D1 are obtained by performing SCMA codebook mapping, SCMA decoding needs to be performed. Or, if the received A1, B1, C1, and D1 are not obtained by performing SCMA codebook mapping, SCMA decoding does not need to be performed. Certainly, the NodeB may only receive the signals and does not perform decoding in operation S9060, and performs decoding in a subsequent operation such as S9100 or S9110 to obtain A1', B1', C1', and D1'.

S9070: UE A, UE B, UE C, and UE D separately perform SCMA codebook mapping on to-be-sent data by using the delivered SCMA codebooks, so as to obtain second source signals A2, B2, C2, and D2.

S9080: The RN sends signals E1' and F1' to the NodeB. The sending may be implemented by means of directional transmission or broadcast.

S9090: UE A, UE B, UE C, and UE D separately send the second source signals A2, B2, C2, and D2. The sending may be implemented by means of broadcast, or may be implemented by means of directional transmission. In addition, the sending actions may be performed by the UEs at the same time. The signals E1' and F1' sent by the RN to the NodeB and the second source signals A2, B2, C2, and D2 separately sent by UE A, UE B, UE C, and UE D may be sent by using a same time-frequency resource.

S9100: The NodeB receives the relay signals E1' and F1' and the second source signals A2, B2, C2, and D2. During implementation, received signals of the relay signals E1' and F1' and the second source signals A2, B2, C2, and D2 may be obtained.

The NodeB performs SCMA decoding on the received signals of the relay signals E1' and F1' and the second source signals A2, B2, C2, and D2. There are many manners for performing SCMA decoding. For example, a logarithm-domain message-passing algorithm (log-MPA) may be used to recover information originally sent by each user from a received SCMA signal, or a target genetic algorithm may be used to recover the information originally sent by each user from the received SCMA signal.

During implementation, the NodeB may perform SCMA decoding on the received signals of the relay signals E1' and F1' and the second source signals A2, B2, C2, and D2, to obtain the corresponding estimated signals E1", F1", A2', B2', C2', and D2'. If log-likelihood ratios are used to represent E1", F1", A2', B2', C2', and D2', the E1", F1", A2', B2', C2', and D2' may be represented by LLRe1, LLRf1, LLRa2, LLRb2, LLRc2, and LLRd2. The obtained A2', B2', C2', and D2' may be used as data for next decoding. In this way, A2', B2', C2', and D2' obtained by the NodeB increase a success rate of the NodeB in receiving the signals A2, B2, C2, and D2. According to a conventional relay network coding solution, when obtaining a relay signal E1, a NodeB does not obtain a source signal sent by a source node by using a same time-frequency resource used by a relay node to send the relay signal. However, by using the solution in this embodiment of the present invention, when a relay node sends a relay signal, a source node may send a source signal on a same time-frequency resource, so that a quantity of data transmitted in a system is increased, and transmission efficiency is improved.

S9110: The eNodeB performs decoding of the network coding by using the information E1", F1", A1', B1', C1', and D1', so as to obtain A1, B1, C1, and D1. Certainly, persons skilled in the art may understand from the description herein that obtaining of A1, B1, C1, and D1 may be obtaining of the estimated signals of the received signals of the source signals A1, B1, C1, and D1. For example, for exclusive-OR network decoding, a principle of network decoding may be simply represented by A1'=A1'⊕E1". Certainly, during implementation, calculation may not be performed according to the equation. The equation herein merely represents a principle of network decoding in some embodiments of the present invention.

The following describes an exclusive-OR network decoding method by using an example in which network decoding is exclusive-OR network decoding. Decoding corresponding to physical layer network coding is similar to the exclusive-OR network decoding method. Persons skilled in the art may understand that during implementation, there are numerous implementation manners and variations of solutions for exclusive-OR network decoding.

Joint decoding is performed on E1" and F1" obtained by performing SCMA decoding on E1' and F1' and on A1', B1', C1', and D1' previously stored by the eNB. Joint decoding performed on E1", A1', and B1' is used as an example below for description.

The eNB demodulates the estimated signals A1' and B1' to obtain corresponding log-likelihood ratios represented by $LLR_{m1}$ and $LLR_{m2}$, and performs SCMA decoding on E1" to obtain a corresponding log-likelihood ratio represented by $LLR_{m3}$. According to network coding, there is a relationship $m_3=m_1\otimes m_2$. In this case, according to a definition of the log-likelihood ratio, $$LLR_{m_i} = \log\left(\frac{Pr_{ch}(m_i = 0)}{Pr_{ch}(m_i = 1)}\right) \quad (1)$$

$$= \log\left(\frac{Pr_{ch}(m_i = 0)}{1 - Pr_{ch}(m_i = 0)}\right)(i = 1, 2, 3)$$

Logarithms of e are assigned on both sides of equation (1), and it may be obtained by means of calculation that:

$$Pr_{ch}(m_i = 0) = \frac{e^{LLR_{m_i}}}{1 + e^{LLR_{m_i}}}(i = 1, 2, 3) \quad (2)$$

It may be easily understood that $Pr_{ch}(m_i=1)=1-Pr_{ch}(m_i=0)$.

Because $m_3$ is a message obtained by performing network coding on $m_1$ and $m_2$, it may be obtained according to exclusive-OR features between $m_1$, $m_2$, and $m_3$ that:

$$Pr_{ch}^{aprior}(m_1 = 0) = Pr_{ch}(m_3 = 0)Pr_{ch}(m_1 = 0 | m_3 = 0) + \quad (3)$$

$$Pr_{ch}(m_3 = 1)Pr_{ch}(m_1 = 0 | m_3 = 1) =$$

$$\frac{Pr_{ch}(m_3 = 0)Pr_{ch}(m_1 = 0)Pr_{ch}(m_3 = 0 | m_1 = 0)}{Pr_{ch}(m_1 = 0)Pr_{ch}(m_3 = 0 | m_1 = 0) + Pr_{ch}(m_1 = 1)Pr_{ch}(m_3 = 0 | m_1 = 1)} +$$

$$\frac{Pr_{ch}(m_3 = 1)Pr_{ch}(m_1 = 0)Pr_{ch}(m_3 = 1 | m_1 = 0)}{Pr_{ch}(m_1 = 0)Pr_{ch}(m_3 = 1 | m_1 = 0) + Pr_{ch}(m_1 = 1)Pr_{ch}(m_3 = 1 | m_1 = 1)} =$$

$$\frac{Pr_{ch}(m_1 = 0)Pr_{ch}(m_2 = 0)Pr_{ch}(m_3 = 0)}{Pr_{ch}(m_1 = 0)Pr_{ch}(m_2 = 0) + Pr_{ch}(m_1 = 1)Pr_{ch}(m_2 = 1)} +$$

$$\frac{Pr_{ch}(m_1 = 0)Pr_{ch}(m_2 = 1)Pr_{ch}(m_3 = 1)}{Pr_{ch}(m_1 = 0)Pr_{ch}(m_2 = 1) + Pr_{ch}(m_1 = 1)Pr_{ch}(m_2 = 0)}$$

$Pr_{ch}^{aprior}(m_1=0)$ is prior probability information derived from the relationship $m_3 = m_1 \otimes m_2$ when $m_1$ is 0. Likewise, prior probability information derived from the relationship $m_3 = m_1 \otimes m_2$ when $m_1$ is 1 is:

$$Pr_{ch}^{aprior}(m_1 = 1) = Pr_{ch}(m_3 = 0)Pr_{ch}(m_1 = 1 | m_3 = 0) + \quad (4)$$

$$Pr_{ch}(m_3 = 1)Pr_{ch}(m_1 = 1 | m_3 = 1) =$$

$$\frac{Pr_{ch}(m_3 = 0)Pr_{ch}(m_1 = 1)Pr_{ch}(m_3 = 0 | m_1 = 1)}{Pr_{ch}(m_1 = 1)Pr_{ch}(m_3 = 0 | m_1 = 1) + Pr_{ch}(m_1 = 0)Pr_{ch}(m_3 = 0 | m_1 = 0)} +$$

$$\frac{Pr_{ch}(m_3 = 1)Pr_{ch}(m_1 = 1)Pr_{ch}(m_3 = 1 | m_1 = 1)}{Pr_{ch}(m_1 = 0)Pr_{ch}(m_3 = 1 | m_1 = 0) + Pr_{ch}(m_1 = 1)Pr_{ch}(m_3 = 1 | m_1 = 1)} =$$

$$\frac{Pr_{ch}(m_1 = 1)Pr_{ch}(m_2 = 1)Pr_{ch}(m_3 = 0)}{Pr_{ch}(m_1 = 0)Pr_{ch}(m_2 = 0) + Pr_{ch}(m_1 = 1)Pr_{ch}(m_2 = 1)} +$$

$$\frac{Pr_{ch}(m_1 = 1)Pr_{ch}(m_2 = 0)Pr_{ch}(m_3 = 1)}{Pr_{ch}(m_1 = 0)Pr_{ch}(m_2 = 1) + Pr_{ch}(m_1 = 1)Pr_{ch}(m_2 = 0)}$$

Based on equations (3) and (4), and according to the definition of the log-likelihood ratio, it may be obtained that a prior log-likelihood ratio of $m_1$ is:

$$LLR_{m_1}^{aprior} = \log\left(\frac{Pr_{ch}^{aprior}(m_1 = 0)}{Pr_{ch}^{aprior}(m_1 = 1)}\right) \quad (5)$$

In this case, equation (2) is substituted into equations (3) and (4). Then, according to equation (5), the prior log-likelihood ratio of the $m_1$ may be obtained.

Likewise, prior probability information derived from the relationship $m_3 = m_1 \otimes m_2$ when $m_2$ is 0 and 1 are separately shown in equation (6) and equation (7):

$$Pr_{ch}^{aprior}(m_2 = 0) = Pr_{ch}(m_3 = 0)Pr_{ch}(m_2 = 0 | m_3 = 0) + \quad (6)$$

$$Pr_{ch}(m_3 = 1)Pr_{ch}(m_2 = 0 | m_3 = 1) =$$

$$\frac{Pr_{ch}(m_3 = 0)Pr_{ch}(m_2 = 0)Pr_{ch}(m_3 = 0 | m_2 = 0)}{Pr_{ch}(m_2 = 0)Pr_{ch}(m_3 = 0 | m_2 = 0) + Pr_{ch}(m_2 = 1)Pr_{ch}(m_3 = 0 | m_2 = 1)} +$$

$$\frac{Pr_{ch}(m_3 = 1)Pr_{ch}(m_2 = 0)Pr_{ch}(m_3 = 1 | m_2 = 0)}{Pr_{ch}(m_2 = 0)Pr_{ch}(m_3 = 1 | m_2 = 0) + Pr_{ch}(m_2 = 1)Pr_{ch}(m_3 = 1 | m_2 = 1)} =$$

$$\frac{Pr_{ch}(m_1 = 0)Pr_{ch}(m_2 = 0)Pr_{ch}(m_3 = 0)}{Pr_{ch}(m_1 = 0)Pr_{ch}(m_2 = 0) + Pr_{ch}(m_1 = 1)Pr_{ch}(m_2 = 1)} +$$

$$\frac{Pr_{ch}(m_1 = 1)Pr_{ch}(m_2 = 0)Pr_{ch}(m_3 = 1)}{Pr_{ch}(m_1 = 1)Pr_{ch}(m_2 = 0) + Pr_{ch}(m_1 = 0)Pr_{ch}(m_2 = 1)}$$

$$Pr_{ch}^{aprior}(m_2 = 1) = Pr_{ch}(m_3 = 0)Pr_{ch}(m_2 = 1 | m_3 = 0) + \quad (7)$$

$$Pr_{ch}(m_3 = 1)Pr_{ch}(m_2 = 1 | m_3 = 1) =$$

$$\frac{Pr_{ch}(m_3 = 0)Pr_{ch}(m_2 = 1)Pr_{ch}(m_3 = 0 | m_2 = 1)}{Pr_{ch}(m_2 = 0)Pr_{ch}(m_3 = 0 | m_2 = 0) + Pr_{ch}(m_2 = 1)Pr_{ch}(m_3 = 0 | m_2 = 1)} +$$

$$\frac{Pr_{ch}(m_3 = 1)Pr_{ch}(m_2 = 1)Pr_{ch}(m_3 = 1 | m_2 = 1)}{Pr_{ch}(m_2 = 0)Pr_{ch}(m_3 = 1 | m_2 = 0) + Pr_{ch}(m_2 = 1)Pr_{ch}(m_3 = 1 | m_2 = 1)} =$$

$$\frac{Pr_{ch}(m_1 = 1)Pr_{ch}(m_2 = 1)Pr_{ch}(m_3 = 0)}{Pr_{ch}(m_1 = 0)Pr_{ch}(m_2 = 0) + Pr_{ch}(m_1 = 1)Pr_{ch}(m_2 = 1)} +$$

$$\frac{Pr_{ch}(m_1 = 0)Pr_{ch}(m_2 = 1)Pr_{ch}(m_3 = 1)}{Pr_{ch}(m_1 = 1)Pr_{ch}(m_2 = 0) + Pr_{ch}(m_1 = 0)Pr_{ch}(m_2 = 1)}$$

Based on equations (6) and (7), and according to the definition of the log-likelihood ratio, it may be obtained that a prior log-likelihood ratio of $m_2$ is:

$$LLR_{m_2}^{aprior} = \log\left(\frac{Pr_{ch}^{aprior}(m_2 = 0)}{Pr_{ch}^{aprior}(m_2 = 1)}\right) \quad (8)$$

The prior log-likelihood ratios of $m_1$ and $m_2$ obtained above are combined with log-likelihood ratios of $m_1$ and $m_2$ that are obtained after demodulation, so as to obtain posterior log-likelihood ratios of $m_1$ and $m_2$:

$$LLR_{m_i}^{app} = LLR_{m_i} + LLR_{m_i}^{apriop}(i=1,2) \quad (9)$$

$LLR_{m_i}^{app}$ is referred to as the posterior log-likelihood ratios of $m_1$ and $m_2$, and decoding may be performed on $m_1$ and $m_2$ according to the posterior log-likelihood ratios.

In this way, network decoding results of A1' and B1' are obtained by performing decoding on $m_1$ and $m_2$. Likewise, network decoding may be performed on C1', D1', and F1" by using a same method, to obtain corresponding network decoding results of C1' and D1'.

In addition, persons skilled in the art know that there are various types of network coding, and there are also various types of network decoding corresponding to each type of network coding.

An operation similar to operation S9030 is performed after operation S9110 is performed: UE A, UE B, UE C, and UE D respectively send the signals A2, B2, C2, and D2.

Then, operations similar to operations S9040 to S9100 are performed as follows (these operations are not shown in FIG. 9). The NodeB receives received signals of A2, B2, C2, and D2, and performs decoding on the received signals to obtain estimated signals A2', B2', C2', and D2' of the received signals, then performs network coding on A2', B2', C2', and D2', and performs SCMA codebook mapping to obtain E2' and F2'. UE A, UE B, UE C, UE D, and the RN may respectively send signals A3, B3, C3, D3, E2', and F2' on a same time-frequency resource. A3, B3, C3, and D3 are modulation symbols respectively obtained by UE A, UE B, UE C, and UE D by performing mapping on to-be-sent data by using the codebooks indicated by the information about the SCMA codebooks. The NodeB receives the signals E2', F2', A3, B3, C3, and D3 and obtains received signals of E2', F2', A3, B3, C3, and D3. The NodeB performs SCMA decoding on the received signals of E2', F2', A3, B3, C3, and D3 to obtain E2", F2", A3', B3', C3', and D3'. Then, the NodeB performs network decoding by using signals that include E1", F2", and estimated signals A2', B2', C2', and D2' of the received signals received by the NodeB twice (including estimated signals A2', B2', C2', and D2' obtained in step 10, and estimated signals A2', B2', C2', and D2' obtained by the NodeB after receiving the signals A2, B2, C2, D2 respectively sent by UE A, UE B, UE C, and UE D in step 12), to obtain A2', B2', C2', and D2'. Herein, it may be learned that that actually the NodeB receives the source signals related to A2, B2, C2, and D2 twice, in addition to a relay signal, and then performs network decoding, so that a success rate of data transmission is further increased, and transmission efficiency is improved.

According to the foregoing embodiment, it may be learned that because SCMA codebook mapping is used, when an RN sends data obtained after SCMA mapping, UE may also send data obtained after SCMA mapping, so that an amount of data obtained by a NodeB is increased, thereby increasing a success rate of the NodeB in receiving data, and improving transmission efficiency.

Figure 10:
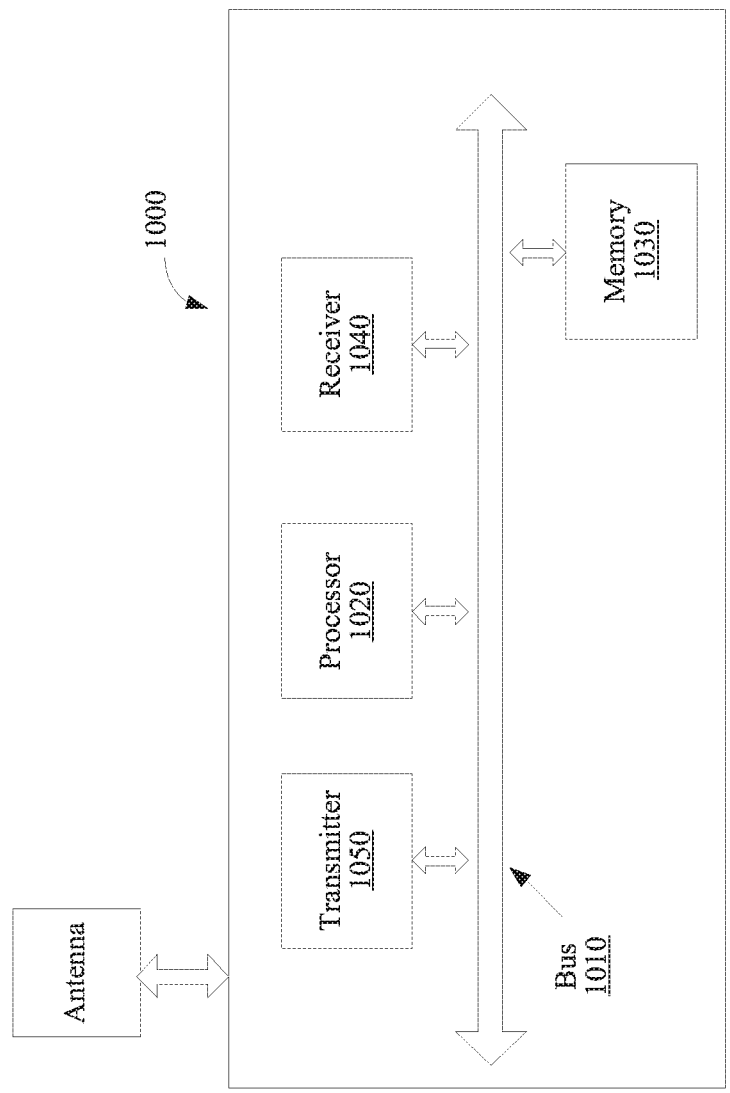
FIG. 10 is a schematic structural diagram of a data transmission device according to an embodiment of the present invention.
Figure 11:
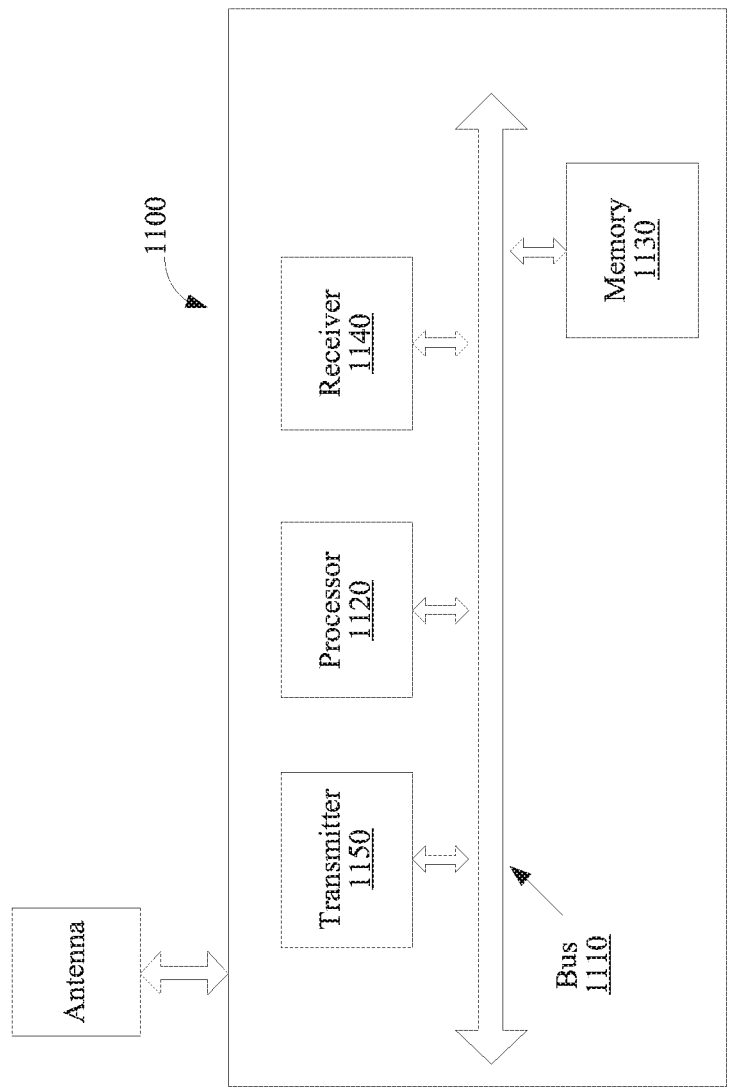
FIG. 11 is a schematic structural diagram of a data transmission device according to an embodiment of the present invention.
Figure 12:
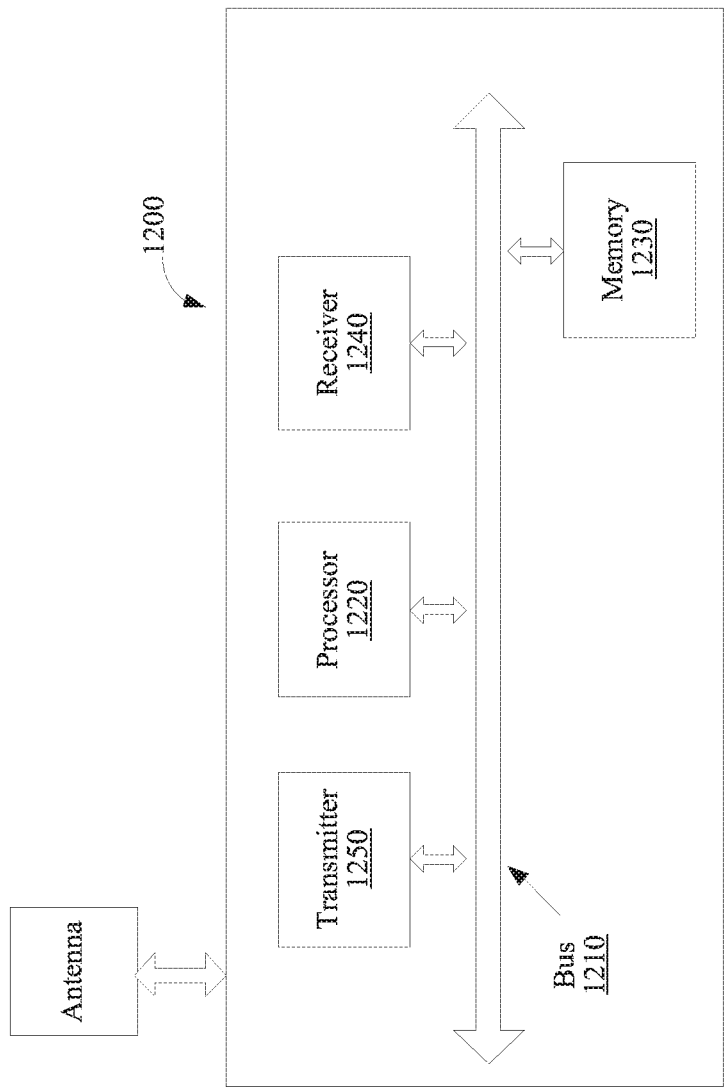
FIG. 12 is a schematic structural diagram of a data transmission device according to an embodiment of the present invention.

The following describes in detail a data transmission device according to an embodiment of the present invention with reference to FIG. 10 to FIG. 12. The technical description of operations in the foregoing method embodiments is also applicable to device embodiments.

FIG. 10 is a schematic block diagram of a data transmission device 1000 according to an embodiment of the present invention. The device may be a relay node. As shown in FIG. 10, the device 1000 includes a bus 1010, a processor 1020 connected to the bus, a memory 1030 connected to the bus, a transmitter 1050 connected to the bus, and a receiver 1040 connected to the bus.

The processor calls, by using the bus, a program stored in the memory, so as to control the receiver to receive information that is about an SCMA codebook used by the device and that is sent by a destination node. The SCMA codebook includes two or more code words. The code word is a multi-dimensional complex vector and is used to represent a mapping relationship between data and at least two modulation symbols. The at least two modulation symbols include at least one zero modulation symbol and at least one non-zero modulation symbol. The processor also calls, by using the bus, the program stored in the memory, so as to control the receiver to receive two or more source signals sent by two or more source nodes.

The processor is further configured to perform, by using the codebook indicated by the information about the SCMA codebook, SCMA codebook mapping on a signal obtained after network coding, so as to obtain a relay signal. The relay signal is at least two modulation symbols. The at least two modulation symbols may include at least one zero modulation symbol and at least one non-zero modulation symbol.

The processor calls, by using the bus, the program stored in the memory, so as to control the transmitter to send, to the destination node, the relay signal obtained after the SCMA codebook mapping. Optionally, a time-frequency resource used by the relay node to send the relay signal is also used by at least one source node to send a source signal obtained by mapping using an SCMA codebook used by the at least one source node.

In this embodiment of the present invention, a relay node may perform network coding on a source signal, then perform SCMA codebook mapping to obtain a relay signal, and send the relay signal. In this way, when the relay node sends the relay signal, a source node can also send, on a same time-frequency resource, a source signal obtained after SCMA codebook mapping, so that transmission efficiency is improved.

Optionally, the processor is further configured to control the receiver to receive information that is about source nodes requiring the device to perform network coding and that is sent by the destination node. The processor is further configured to determine whether the received signals are sent by the source nodes requiring the device to perform network coding, and if the received signals are sent by the source nodes requiring the device to perform network coding, perform the network coding on the received two or more source signals. By using the information about the source nodes requiring the relay node to perform network coding, the relay node only needs to perform network coding on the signals from the source nodes requiring the relay node to perform network coding, so that transmission flexibility is improved.

Optionally, the network coding is exclusive-OR coding. The processor is further configured to perform exclusive-OR coding on the two or more source signals.

Optionally, the network coding is physical layer network coding. The processor is further configured to perform physical layer network coding on the received two or more source signals according to a mapping relationship.

Optionally, the processor is further configured to control the receiver to receive a resource for sending at least two modulation symbols obtained after SCMA mapping. The processor is further configured to control the transmitter to send, on the resource, the at least two modulation symbols obtained after the SCMA mapping.

Optionally, the information about the SCMA codebook used by the device is carried in DCI.

Optionally, the information about the source nodes requiring the device to perform network coding is carried in DCI.

FIG. 11 is a schematic block diagram of a data transmission device 1100 according to an embodiment of the present invention. The device may be a destination node. As shown in FIG. 11, the device 1100 includes a bus 1110, a processor 1120 connected to the bus, a memory 1130 connected to the bus, a transmitter 1150 connected to the bus, and a receiver 1140 connected to the bus.

The processor calls, by using the bus, a program stored in the memory, so as to control the transmitter to separately send, to two or more source nodes, information about an SCMA codebook used by each source node. The SCMA codebook includes two or more code words. The code word is a multi-dimensional complex vector and is used to represent a mapping relationship between data and at least two modulation symbols. The at least two modulation symbols include at least one zero modulation symbol and at least one non-zero modulation symbol. The processor further calls, by using the bus, the program stored in the memory, so as to control the transmitter to send information about an SCMA codebook used by a relay node to the relay node.

The processor further calls, by using the bus, the program stored in the memory, so as to control the receiver to receive a relay signal sent by the relay node. The relay signal sent by the relay node is at least two modulation symbols obtained by the relay node after the relay node receives two or more first source signals sent by the two or more source nodes, performs network coding on the received two or more first source signals, and performs, by using the codebook indicated by the information about the SCMA codebook used by the relay node, SCMA codebook mapping on a signal obtained after the network coding. The at least two modulation symbols may include at least one zero modulation symbol and at least one non-zero modulation symbol. The processor further calls, by using the bus, the program stored in the memory so as to control the receiver to receive a second source signal sent by at least one source node of the two or more source nodes. The second source signal is obtained by the source node by performing SCMA codebook mapping by using the codebook indicated by the information about the SCMA codebook used by the source node. The second source signal and the relay signal are sent by using a same time-frequency resource.

In this embodiment, a destination node may receive a source signal sent by a source node and receive a relay signal from a relay node at the same time, so that a quantity of received signals is increased, and transmission efficiency is improved.

Optionally, the processor is further configured to control the receiver to receive a first source signal sent by at least one source node of the two or more source nodes, and the processor is further configured to perform network decoding on the received first source signal and relay signal. Because the relay signal is obtained by means of network coding according to the first source signal, network decoding may be performed by using the relay signal and the first source signal, thereby increasing a success rate of decoding.

Optionally, the processor is further configured to control the transmitter to send, to the relay node, information about source nodes requiring the relay node to perform network coding. The information about the source nodes is used by the relay node to determine whether to perform network coding on the received source signals. By using the information about the source nodes requiring the relay node to perform network coding, flexibility of performing network coding by the relay node is improved, and therefore flexibility of a system is improved.

Optionally, the information about the SCMA codebook is carried in a DCI message for sending.

Optionally, the information about the source nodes requiring the relay node to perform network coding is carried in a DCI message for sending.

FIG. 12 is a schematic block diagram of a data transmission device 1200 according to an embodiment of the present invention. The device may be a source node. As shown in FIG. 12, the device 1200 includes a bus 1210, a processor 1220 connected to the bus, a memory 1230 connected to the bus, a transmitter 1250 connected to the bus, and a receiver 1240 connected to the bus.

The processor calls, by using the bus, a program stored in the memory, so as to control the receiver to receive information about a first resource sent by a destination node, and control the receiver to receive information about a second resource and information about an SCMA codebook used by the source node that are sent by the destination node. The SCMA codebook includes at least two code words, the code word is a multi-dimensional complex vector and is used to indicate a mapping relationship between data and at least two modulation symbols. The at least two modulation symbols include at least one zero modulation symbol and at least one non-zero modulation symbol.

The processor calls, by using the bus, the program stored in the memory, so as to control the transmitter to send a first source signal to the destination node or a relay node or both on the first resource. The first source signal may be a source signal obtained by performing non-SCMA codebook mapping, and for example, may be a source signal obtained by performing constellation mapping. The processor further calls, by using the bus, the program stored in the memory so as to control the transmitter to send the second source signal to the destination node or the relay node or both on the second resource. The second source signal is at least two modulation symbols obtained by the source node by performing SCMA codebook mapping on data by using the SCMA codebook indicated by the information about the SCMA codebook. The at least two modulation symbols may be referred to as a source signal or a source signal obtained after SCMA codebook mapping.

Optionally, a time-frequency resource used by the source node to send the at least two modulation symbols obtained after the SCMA codebook mapping is used by at least one relay node to send a relay signal obtained after SCMA codebook mapping.

Optionally, the information about the first resource is carried in first DCI.

Optionally, the information about the second resource is carried in second DCI.

Optionally, the information about the SCMA codebook is carried in third DCI.

In this embodiment of the present invention, a source node may send, according to information sent by a destination node, a signal obtained by performing SCMA codebook mapping or a signal obtained by performing non-SCMA codebook mapping, so that flexible transmission is implemented.

In the foregoing multiple embodiments, the processor, such as the processor 1020, 1120, or 1220, may also be referred to as a CPU. The memory may include a read-only memory and a random access memory, and provides an instruction and data to the processor. The memory may further include a non-volatile random access memory (NVRAM). In a specific application, the device, such as the device moo, 1100, or 1200, may be built into or may be a network device such as a wireless communications device like a mobile phone or a network side device, and may further include a carrier for accommodating a transmitter circuit and a receiver circuit, so as to allow data to be transmitted and received between the device and a remote location. The transmitter circuit and the receiver circuit may be coupled to an antenna. Various components of the device are coupled together by using a bus. The bus not only includes a data bus, but also includes a power bus, a control bus, and a status signal bus. However, for the purpose of clear description, various buses are marked as a bus, such as the bus 1010, 1110, or bus 1210, in the drawings. Specifically, a decoder and a processing unit may be integrated together in different products.

The processor may implement or perform steps and logical block diagrams disclosed in the method embodiments of the present invention. The general-purpose processor may be a microprocessor, or the processor may be any conventional processor, decoder, encoder, or the like. Steps of the method disclosed with reference to the embodiments may be directly embodied as being implemented by a hardware processor, or implemented by a combination of hardware and software modules in a decoding processor, or implemented by a combination of hardware and software modules in an encoding processor. The software module may reside in a mature storage medium in the art, such as a random access memory, a flash memory, a read-only memory, a programmable read-only memory, an electrically-erasable programmable memory, or a register.

It should be understood that in the foregoing embodiments of the present invention, the processor may be a central processing unit (CPU), or the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor, or the like.

The memory may include a read-only memory and a random access memory, and provides an instruction and data to the processor. A part of the memory, such as the memory 1030, 1130, or 1230, may further include a non-volatile random access memory. For example, the memory may further store device type information.

The bus system may include a power bus, a control bus, a status signal bus, and the like in addition to a data bus. However, for the purpose of clear description, various buses are marked as a bus system in the drawings.

During implementation, each operation in the foregoing method embodiments may be implemented by an integrated logic circuit of hardware of the processor, such as the processor 1020, 1120, or 1220, or by a software-form instruction. Steps of the method disclosed with reference to the embodiments of the present invention may be directly embodied as being implemented by a hardware processor, or implemented by a combination of hardware and software modules in the processor. The software module may reside in a mature storage medium in the art, such as a random access memory, a flash memory, a read-only memory, a programmable read-only memory, an electrically-erasable programmable memory, or a register. The storage medium is located in the memory. The processor reads information in the memory, and uses its hardware to implement operations of the terminal in the foregoing method embodiments.

It should be understood that sequence numbers of the foregoing processes do not mean execution sequences in various embodiments described herein. The execution sequences of the processes should be determined according to functions and internal logic of the processes, and should not be construed as any limitation on the implementation processes of the embodiments described herein.

Persons of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

The disclosure of the present application also includes the following embodiments.

A data transmission method, comprising receiving, by a relay node, information that is about an sparse code multiple access, SCMA, codebook used by the relay node and that is sent by a destination node. The SCMA codebook comprises two or more code words. The code word is a multi-dimensional complex vector and is used to represent a mapping relationship between data and at least two modulation symbols. The at least two modulation symbols comprise at least one zero modulation symbol and at least one non-zero modulation symbol. The method also comprises receiving, by the relay node, two or more source signals sent by two or more source nodes. The method also comprises performing, by the relay node, network coding on the received two or more source signals. The method also comprises performing, by the relay node by using the SCMA codebook indicated by the information about the SCMA codebook, SCMA codebook mapping on a signal obtained after the network coding, so as to obtain a relay signal. The method further comprises sending, by the relay node to the destination node, the relay signal obtained after the SCMA codebook mapping.

The method may further comprise receiving, by the relay node, information that is about source nodes requiring the relay node to perform network coding and that is sent by the destination node. The performing network coding on the received two or more source signals may comprise determining, by the relay node, whether the received signals are sent by the source nodes requiring the relay node to perform network coding, and if the received signals are sent by the source nodes requiring the relay node to perform network coding, performing the network coding on the received signals.

The network coding may be exclusive-OR coding. The performing, by the relay node, network coding on the two or more source signals may comprise performing, by the relay node, exclusive-OR coding on the two or more source signals.

The network coding may be physical layer network coding. The performing, by the relay node, network coding on the two or more source signals may comprise performing physical layer network coding on the received two or more source signals.

The relay node may receive a resource for sending at least two modulation symbols obtained after SCMA codebook mapping. The sending, by the relay node to the destination node, the relay signal obtained after the SCMA codebook mapping may comprise sending, by the relay node on the resource, the relay signal obtained after the SCMA codebook mapping.

The information about the SCMA codebook used by the relay node may be carried in DCI.

The information about the source nodes requiring the relay node to perform network coding may be carried in DCI.

A time-frequency resource may be used by the relay node to send the relay signal is used by at least one of the source nodes to send a source signal obtained after SCMA codebook mapping.

In another embodiment, a data transmission method comprises separately sending, by a destination node to two or more source nodes, information about an SCMA codebook used by each source node. The SCMA codebook comprises two or more code words, the code word is a multi-dimensional complex vector and is used to represent a mapping relationship between bit data and at least two modulation symbols. The at least two modulation symbols comprise at least one zero modulation symbol and at least one non-zero modulation symbol. The method also comprises sending, by the destination node, information about an SCMA codebook used by a relay node to the relay node. The method also comprises receiving, by the destination node, a relay signal sent by the relay node. The relay signal sent by the relay node is at least two modulation symbols obtained by the relay node after the relay node receives two or more first source signals sent by the two or more source nodes, performs network coding on the received two or more first source signals, and performs, by using the codebook indicated by the information about the SCMA codebook used by the relay node, SCMA codebook mapping on a signal obtained after the network coding. The method also comprises receiving, by the destination node, a second source signal sent by at least one source node of the two or more source nodes. The second source signal is obtained by the source node by performing codebook mapping by using the codebook indicated by the information about the SCMA codebook used by the source node. The second source signal and the relay signal are sent by using a same time-frequency resource.

Before the receiving, by the destination node, a relay signal sent by the relay node, the method may further comprise receiving, by the destination node, a first source signal sent by at least one source node of the two or more source nodes. After the receiving, by the destination node, a relay signal sent by the relay node, the method may further comprise performing, by the destination node, network decoding on the received first source signal and relay signal.

The destination node may send, to the relay node, information about source nodes requiring the relay node to perform network coding. The information about the source nodes may be used by the relay node to determine whether to perform network coding on the received source signals.

The information about the SCMA codebook may be carried in a DCI message for sending.

The information about the source nodes requiring the relay node to perform network coding may be carried in a DCI message for sending.

In another embodiment, a data transmission method comprises receiving, by a source node, information about a first resource sent by a destination node. The method also comprises sending, by the source node, a first source signal to the destination node on the first resource. The method also comprises receiving, by the source node, information about a second resource and information about an sparse code multiple access SCMA codebook used by the source node that are sent by the destination node. The SCMA codebook comprises two or more code words. The code word is a multi-dimensional complex vector and is used to represent a mapping relationship between data and at least two modulation symbols. The at least two modulation symbols comprise at least one zero modulation symbol and at least one non-zero modulation symbol. The method also comprises sending, by the source node, a second source signal to the destination node on the second resource. The second source signal is at least two modulation symbols obtained by the source node by performing SCMA codebook mapping on data by using the SCMA codebook indicated by the information about the SCMA codebook.

The information about the first resource may be carried in first DCI.

The nformation about the second resource may be carried in second DCI.

The information about the SCMA codebook may be carried in third DCI.

In another embodiment, a data transmission device comprises a bus, a processor connected to the bus, a transmitter connected to the bus, and a receiver connected to the bus. The processor calls, by using the bus, a program stored in a memory, so as to control the receiver to receive information that is about an SCMA codebook used by the device and that is sent by a destination node. The SCMA codebook comprises two or more code words. The code word is a multi-dimensional complex vector and is used to represent a mapping relationship between data and at least two modulation symbols. The at least two modulation symbols comprise at least one zero modulation symbol and at least one non-zero modulation symbol. The processor further calls, by using the bus, the program stored in the memory, so as to control the receiver to receive two or more source signals sent by two or more source nodes. The processor is further configured to perform network coding on the received two or more source signals, and perform, by using the SCMA codebook indicated by the information about the SCMA codebook, SCMA codebook mapping on a signal obtained after the network coding, so as to obtain a relay signal. The processor further calls, by using the bus, the program stored in the memory, so as to control the transmitter to send, to the destination node, the relay signal obtained after the SCMA codebook mapping.

The processor may further be configured to control the receiver to receive information that is about source nodes requiring the device to perform network coding and that is sent by the destination node. The processor may further be configured to determine whether the received signals are sent by the source nodes requiring the device to perform network coding, and if the received signals are sent by the source nodes requiring the device to perform network coding, perform the network coding on the received signals.

The network coding may be exclusive-OR coding. The processor may further be configured to perform exclusive-OR coding on the two or more source signals.

The network coding may be physical layer network coding. The processor may further be configured to perform physical layer network coding on the received two or more source signals according to a mapping relationship.

The processor may further be configured to control the receiver to receive a resource for sending at least two modulation symbols obtained after SCMA codebook mapping. The processor may further be configured to control the transmitter to send, on the resource, the at least two modulation symbols obtained after the SCMA codebook mapping.

The information about the SCMA codebook used by the device may be carried in DCI.

The information about the source nodes requiring the device to perform network coding may be carried in DCI.

Aa time-frequency resource used by the transmitter to send the relay signal may be used by at least one of the source nodes to send a source signal obtained after SCMA codebook mapping.

The device may be a relay node.

In another embodiment, a data transmission device comprises a bus, a processor connected to the bus, a transmitter connected to the bus, and a receiver connected to the bus. The processor calls, by using the bus, a program stored in the memory, so as to control the transmitter to separately send, to two or more source nodes, information about an SCMA codebook used by each source node. The SCMA codebook comprises two or more code words. The code word is a multi-dimensional complex vector and is used to represent a mapping relationship between bit data and at least two modulation symbols. The at least two modulation symbols comprise at least one zero modulation symbol and at least one non-zero modulation symbol. The processor further calls, by using the bus, the program stored in the memory to control the transmitter to send information about an SCMA codebook used by a relay node to the relay node. The processor further calls, by using the bus, the program stored in the memory, so as to control the receiver to receive a relay signal sent by the relay node. The relay signal sent by the relay node is at least two modulation symbols obtained by the relay node after the relay node receives two or more first source signals sent by the two or more source nodes, performs network coding on the received two or more first source signals, and performs, by using the codebook indicated by the information about the SCMA codebook used by the relay node, SCMA codebook mapping on a signal obtained after the network coding. The processor further calls, by using the bus, the program stored in the memory to control the receiver to receive a second source signal sent by at least one source node of the two or more source nodes. The second source signal is obtained by the source node by performing codebook mapping by using the codebook indicated by the information about the SCMA codebook used by the source node. The second source signal and the relay signal are sent by using a same time-frequency resource.

The processor may be further configured to control the receiver to receive a first source signal sent by at least one source node of the two or more source nodes. The processor may be further configured to perform network decoding on the received first source signal and relay signal.

The processor may be further configured to control the transmitter to send, to the relay node, information about source nodes requiring the relay node to perform network coding. The information about the source nodes may be used by the relay node to determine whether to perform network coding on the received source signals.

The information about the SCMA codebook may be carried in a DCI message for sending.

The information about the source nodes requiring the relay node to perform network coding may be carried in a DCI message for sending.

The device may be a source node.

In another embodiment, a data transmission device comprises a bus, a processor connected to the bus; a transmitter connected to the bus, and a receiver connected to the bus. The processor calls, by using the bus, a program stored in the memory, so as to control the receiver to receive information about a first resource sent by a destination node, and control the receiver to receive information about a second resource and information about an SCMA codebook used by the device that are sent by the destination node. The SCMA codebook comprises at least two code words. The code word is a multi-dimensional complex vector and is used to represent a mapping relationship between data and at least two modulation symbols. The at least two modulation symbols comprise at least one zero modulation symbol and at least one non-zero modulation symbol. The processor further calls, by using the bus, the program stored in the memory, so as to control the transmitter to send a first source signal to the destination node on the first resource, and control the transmitter to send a second source signal to the destination node on the second resource. The second source signal is at least two modulation symbols obtained by the device by performing SCMA codebook mapping on data by using the SCMA codebook indicated by the information about the SCMA codebook.

The information about the first resource may be carried in first DCI.

The information about the second resource may be carried in second DCI.

The information about the SCMA codebook may be carried in third DCI.

What is claimed is:

1. A device, comprising:
   a bus;
   a processor connected to the bus;
   a transmitter connected to the bus; and
   a receiver connected to the bus;
   wherein the processor calls, using the bus, a program stored in a memory, so as to:
   control the receiver to receive information that is about a sparse code multiple access (SCMA) codebook used by the device and that is sent by a destination node, wherein the SCMA codebook comprises a plurality of code words, each code word is a multi-dimensional complex vector and respectively represents a mapping relationship between data and a plurality of modulation symbols, and the plurality of modulation symbols comprise a zero modulation symbol and a non-zero modulation symbol;
control the receiver to receive a plurality of source signals sent by a plurality of source nodes;
perform network coding on the plurality of source signals;
perform, using the SCMA codebook indicated by the information about the SCMA codebook, SCMA codebook mapping on one of a plurality of signals obtained after the network coding, so as to obtain a relay signal; and
control the transmitter to send, to the destination node, the relay signal.

2. The device according to claim 1, wherein the processor calls, using the bus, the program stored in the memory, so as to perform the network coding, by:
controlling the receiver to receive information that is about the plurality of source nodes requiring the device to perform network coding and that is sent by the destination node;
determining whether the plurality of source signals sent by the plurality of source nodes require the device to perform network coding; and
when one of the plurality of source signals sent by the one of the plurality of source nodes requires the device to perform network coding, performing the network coding on the one of the plurality of source signals.

3. The device according to claim 1, wherein the network coding is exclusive-OR coding; and wherein the processor calls, using the bus, the program stored in the memory, so as to perform the network coding, by performing exclusive-OR coding on the plurality of source signals.

4. The device according to claim 1, wherein the network coding is physical layer network coding; and wherein the processor further calls, using the bus, the program stored in the memory, so as to perform the network coding, by performing physical layer network coding on the plurality of source signals according to a mapping relationship.

5. The device according to claim 1, wherein the processor further calls, using the bus, the program stored in the memory, so as to:
control the receiver to receive a resource for sending the plurality of modulation symbols obtained after SCMA codebook mapping; and
control the transmitter to send, on the resource, the plurality of modulation symbols obtained after the SCMA codebook mapping.

6. The device according to claim 1, wherein the information about the SCMA codebook used by the device is carried in downlink control information.

7. The device according to claim 1, wherein the information about the plurality of source nodes requiring the device to perform network coding is carried in downlink control information.

8. The device according to claim 1, wherein a time-frequency resource used by the transmitter to send the relay signal is used by one of the plurality of source nodes to send one of the plurality of source signals obtained after the SCMA codebook mapping.

9. A device, comprising:
a bus;
a processor connected to the bus;
a transmitter connected to the bus; and
a receiver connected to the bus;
wherein the processor calls, using the bus, a program stored in a memory, so as to:
control the transmitter to separately send, to each of a plurality of source nodes, information about an SCMA codebook used by the source node, wherein the SCMA codebook comprises a plurality of code words, each code word is a multi-dimensional complex vector and is used to represent a mapping relationship between bit data and a plurality of modulation symbols, and the plurality of modulation symbols comprise a zero modulation symbol and a non-zero modulation symbol;
control the transmitter to send information about the SCMA codebook used by a relay node to the relay node; and
control the receiver to receive a relay signal sent by the relay node, wherein the relay signal sent by the relay node comprises a plurality of modulation symbols obtained by the relay node after the relay node receives a plurality of first source signals from the plurality of source nodes, performs network coding on the plurality of first source signals, and performs, using the SCMA codebook indicated by the information about the SCMA codebook used by the relay node, SCMA codebook mapping on one of the plurality of first source signals after performing the network coding; and
control the receiver to receive a second source signal sent by one of the plurality of source nodes, wherein the second source signal is obtained by the source node by performing the SCMA codebook mapping, using the codebook indicated by the information about the SCMA codebook used by the source node, and the second source signal and the relay signal are sent using a same time-frequency resource.

10. The device according to claim 9, wherein the processor further calls, using the bus, the program stored in the memory to:
control the receiver to receive one of the plurality of first source signals sent by one of the plurality of source nodes; and
perform network decoding on the received first source signal and the relay signal.

11. The device according to claim 9, wherein the information about the SCMA codebook is carried in a downlink control information message for sending.

12. The device according to claim 10, wherein the information about the plurality of source nodes requiring the relay node to perform network coding is carried in a downlink control information message for sending.

13. The device according to claim 10, wherein the processor calls, using the bus, the program stored in the memory to control the transmitter to send, to the relay node, information about whether the source nodes require the relay node to perform network coding; and
wherein, for each source signal in the plurality of first source signals and the second source signal, the information about whether network coding is required by a respective one of the source nodes of the source signal is used by the relay node to determine whether to perform network coding on the source signal.

14. A device, comprising:
a bus;
a processor connected to the bus;
a transmitter connected to the bus; and
a receiver connected to the bus;
wherein the processor calls, using the bus, a program stored in a memory, so as to:
control the receiver to receive information about a first resource sent by a destination node;

control the receiver to receive information about a second resource and information about an SCMA codebook used by the device that are sent by the destination node, wherein the SCMA codebook comprises a plurality of code words, each code word is a multi-dimensional complex vector and is used to represent a mapping relationship between data and a plurality of modulation symbols, and the plurality of modulation symbols comprise a zero modulation symbol and a non-zero modulation symbol;

control the transmitter to send a first source signal to the destination node on the first resource; and control the transmitter to send a second source signal to the destination node on the second resource, wherein the second source signal comprises a plurality of modulation symbols obtained by the device by performing SCMA codebook mapping on data, using the SCMA codebook indicated by the information about the SCMA codebook.

15. The device according to claim 14, wherein the information about the first resource is carried in first downlink control information.

16. The device according to claim 14, wherein the information about the second resource is carried in second downlink control information.

17. The device according to claim 14, wherein the information about the SCMA codebook is carried in third downlink control information.

\* \* \* \* \*